United States Patent
Bai et al.

(10) Patent No.: US 10,668,463 B2
(45) Date of Patent: Jun. 2, 2020

(54) METHODS FOR REGENERATING AND REJUVENATING CATALYSTS

(71) Applicant: ExxonMobil Research and Engineering Company, Annandale, NJ (US)

(72) Inventors: Chuansheng Bai, Phillipsburg, NJ (US); Paul Podsiadlo, Humble, TX (US); Stephen J. McCarthy, Center Valley, PA (US); Kiara M Benitez, Belvidere, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 101 days.

(21) Appl. No.: 15/962,318

(22) Filed: Apr. 25, 2018

(65) Prior Publication Data

US 2018/0318822 A1   Nov. 8, 2018

Related U.S. Application Data

(60) Provisional application No. 62/501,856, filed on May 5, 2017.

(51) Int. Cl.

| | |
|---|---|
| *B01J 38/68* | (2006.01) |
| *B01J 29/48* | (2006.01) |
| *B01J 38/02* | (2006.01) |
| *C10G 45/64* | (2006.01) |
| *B01J 29/90* | (2006.01) |
| *B01J 37/20* | (2006.01) |
| *C10G 45/58* | (2006.01) |
| *B01J 37/02* | (2006.01) |
| *B01J 31/04* | (2006.01) |

(52) U.S. Cl.
CPC ............... *B01J 38/68* (2013.01); *B01J 29/48* (2013.01); *B01J 29/90* (2013.01); *B01J 31/04* (2013.01); *B01J 37/0203* (2013.01); *B01J 37/0236* (2013.01); *B01J 37/20* (2013.01); *B01J 38/02* (2013.01); *C10G 45/58* (2013.01); *C10G 45/64* (2013.01); *C10G 2300/70* (2013.01); *C10G 2300/708* (2013.01)

(58) Field of Classification Search
CPC ... B01J 38/68; B01J 29/48; B01J 29/90; B01J 38/02; C10G 45/64; C10G 2300/708
USPC ........................................................ 502/24
See application file for complete search history.

(56) References Cited

U.S. PATENT DOCUMENTS

| | | |
|---|---|---|
| 8,394,255 B2 | 3/2013 | McCarthy et al. |
| 2009/0261019 A1 | 10/2009 | McCarthy et al. |
| 2011/0315599 A1 | 12/2011 | Prentice et al. |
| 2013/0165316 A1 | 6/2013 | Guichard et al. |
| 2017/0175011 A1 | 6/2017 | McCarthy et al. |
| 2017/0175015 A1 | 6/2017 | Podsiadlo et al. |

FOREIGN PATENT DOCUMENTS

WO            200102092 A1    1/2001

OTHER PUBLICATIONS

The International Search Report and Written Opinion of PCT/US2018/029312 dated Jun. 21, 2018.
Database of Zeolite Structures, Structure Commission of the International Zeolite Association, Jun. 27, 2018, www.iza-structure.org/databases.

*Primary Examiner* — Edward M Johnson
(74) *Attorney, Agent, or Firm* — Andrew T. Ward; Joseph E. Wrkich; Ryan L. Lobato

(57) ABSTRACT

Methods for regenerating and/or rejuvenating catalysts, particularly dewaxing catalysts, as well as methods for performing dewaxing of diesel or distillate boiling range feeds with the regenerated and/or rejuvenated catalyst are provided herein. The regeneration and/or rejuvenation methods can include calcining spent catalyst followed by contacting the calcined catalyst with a solution comprising a complexing agent, which can restore hydrotreatment (HDT) activity and dewaxing activity of the spent catalyst such that it may be reused during hydroprocessing.

17 Claims, 10 Drawing Sheets

METHODS FOR REGENERATING AND REJUVENATING CATALYSTS

CROSS-REFERENCE TO RELATED APPLICATIONS

This application claims priority to U.S. Provisional Application Ser. No. 62/501,856 filed May 5, 2017 which is herein incorporated by reference in its entirety.

FIELD

Methods for regenerating and/or rejuvenating catalysts, particularly dewaxing catalysts, regenerated and/or rejuvenated catalysts and corresponding methods suitable for hydroprocessing of distillate boiling range feeds are provided, such as distillate boiling range feeds suitable for fuels production.

BACKGROUND

Hydroprocessing of hydrocarbon feedstocks is often used to convert lower value hydrocarbon fractions into higher value products, such as conversion of vacuum gas oil (VGO) feedstocks to diesel fuel and lubricants. Typical hydrocracking reaction schemes can include an initial hydrotreatment step, a hydrocracking step, and a post hydrotreatment step. After these steps, the effluent can be fractionated to separate out a desired diesel fuel and/or lubricant oil basestock. However, the requirements for production of diesel boiling range fuels can potentially vary during the course of a year. During summer months, a primary goal of hydroprocessing can be reduction of sulfur and/or nitrogen content of diesel boiling range fuels in order to satisfy regulatory requirements. Sulfur reduction can also be important during winter months, but an additional consideration can be improving the cold flow properties of the diesel boiling range fuels. Dewaxing is required when highly paraffinic oils are to be used in products which need to remain mobile at low temperatures, e.g., lubricating oils, heating oils and jet fuels. The straight chain normal and slightly branched paraffinic substituents which are present in oils of this kind are waxes which cause high pour points and high cloud points in the oils. In heavy oils, cyclic paraffins and aromatics having paraffinic side chains are also present as wax. If adequately low pour points are to be obtained, these waxes must be wholly or partly removed, or converted to non-waxy analogues. Thus, catalyst dewaxing of diesel boiling range fractions can be used to provide improved cold flow properties.

However, during the refinery cycle, hydrotreatment (HDT) activity and dewaxing activity of the dewaxing catalysts decreases as coke accumulates on the catalyst. Typically, the spent catalysts are disposed of or sent to a third party for metals reclamation. During the reclamation process, the catalyst support, e.g., a zeolite, is destroyed, and the catalyst metals are recovered. Consequently, fresh catalyst must be produced from materials, such as zeolites, base metals and/or noble metals. Thus, there is a need for regeneration and rejuvenation methods for restoring HDT and dewaxing activity to spent catalysts, so that catalysts may be reused without the need for constantly producing fresh catalyst.

U.S. Pat. No. 8,394,255 describes methods for integrated hydrocracking and dewaxing of a feed under sour conditions for formation of diesel and lubricant boiling range fractions.

U.S. Provisional Patent Application No. 62/270,213 describes base metal dewaxing catalysts, methods for making the base metal dewaxing catalysts, and methods for performing dewaxing using such catalysts.

U.S. Provisional Patent Application No. 62/270,234 describes methods for dewaxing distillate boiling range feeds, such as distillate boiling range feeds suitable for fuels production.

SUMMARY

It has been found that a combination of regeneration and rejuvenation steps including calcining spent catalyst followed by contacting the calcined catalyst with a solution comprising a complexing agent can restore HDT activity and dewaxing activity of the spent catalyst such that it may be reused during hydroprocessing.

In various aspects, a method for regenerating and rejuvenating a spent catalyst is provided, wherein the method comprises a regeneration step and a rejuvenation step. The regeneration step can comprise optionally, removing at least a portion of residual hydrocarbons on the spent catalyst, for example, by contacting the spent catalyst with air and/or nitrogen to dry the spent catalyst. In some aspects, the regeneration step can comprise calcining the spent catalyst in the presence of air at a temperature of about 370° C. to about 710° C. to remove at least a portion of coke present on the spent catalyst to form a calcined catalyst, for example, the spent catalyst may be calcined in air for at least about 30 minutes. In some aspects, the regeneration step optionally may further comprise calcining the spent catalyst in the presence of an inert gas at a temperature of about 370° C. to about 710° C. The rejuvenation step can comprise contacting a solution comprising a complexing agent with the calcined catalyst to form a modified catalyst, wherein a molar ratio of the complexing agent to a base metal present in the spent catalyst is at least about 1.25, for example about 1.25 to about 10. The rejuvenation step can further comprise drying the modified catalyst to form a rejuvenated catalyst, for example, the modified catalyst may be dried at a temperature of about 50° C. to about 250° C.

In some aspects, about 5.0 wt % to 95 wt % of the coke may be removed from the spent catalyst during the regeneration step.

In some aspects, the solution comprising a complexing agent can be contacted with the calcined catalyst at a temperature of from about 15° C. to less than the boiling point of the solution and/or for about 30 minutes to about 120 minutes. In some aspects, the complexing agent comprises an organic compound comprising 2-10 carbon atoms and a carbon atom to oxygen atom ratio of about 0.6 to about 2. In some aspects, the complexing agent comprises a glycol, a carboxylic acid, or a combination thereof.

In some aspects, the rejuvenated catalyst can have at least about 90% hydrodesulfurization (HDS) activity recovered and/or at least about 90% hydrodenitrogenation (HDN) activity recovered.

In some aspects, the spent catalyst may comprise at least one Group 8-10 base metal and at least one Group 6 metal on a support comprising a zeolite framework structure. In some aspects, the at least one Group 8-10 base metal may be Ni and/or Co and the at least one Group 6 metal may be W and/or Mo. In some aspects, the zeolite framework structure may be selected from the group consisting of EUO, FAU, FER, MEL, MFI, MRE, MTT, USY, and a combination thereof, for example, the zeolite framework structure may comprise comprises ZSM-5, ZSM-11, ZSM-23 ZSM-48, a zeolitic framework structure having a 10-member ring as a largest pore channel, or a combination thereof.

In other aspects, a method for removing coke from a spent catalyst is provided. The method may comprise optionally, removing at least a portion of residual hydrocarbons on the spent catalyst by contacting the spent catalyst with air and/or nitrogen to dry the spent catalyst, wherein the spent catalyst comprises at least one Group 8-10 base metal and at least one Group 6 metal on a support comprising a zeolite framework structure, and calcining the spent catalyst. The spent catalyst may be calcined in the presence of an inert gas at a temperature of about 370° C. to about 710° C. to remove at least a portion of coke present on the spent catalyst, and calcined in the presence of air at a temperature of about 370° C. to about 710° C. to remove at least a further portion of coke present on the spent catalyst to form a calcined catalyst.

In some aspects, about 5.0 wt % to 95 wt % of the coke is removed from the spent catalyst.

In still other aspects, a method for rejuvenating a spent catalyst is provided. The method may comprise contacting a solution comprising a complexing agent with a spent catalyst to form a modified catalyst, wherein a molar ratio of the complexing agent to a base metal present in the spent catalyst is at least about 1.25, for example about 1.25 to about 10. The method may further comprise drying the modified catalyst to form a rejuvenated catalyst. In some aspects the spent catalyst may comprise at least one Group 8-10 base metal and at least one Group 6 metal on a support comprising a zeolite framework structure. In some aspects, the solution comprising a complexing agent can be contacted with the calcined catalyst at a temperature of from about 15° C. to less than the boiling point of the solution and/or for about 30 minutes to about 120 minutes, and the modified catalyst can be dried at a temperature of about 50° C. to less than 250° C. In some aspects, the complexing agent comprises an organic compound comprising 2-10 carbon atoms and a carbon atom to oxygen atom ratio of about 0.6 to about 2. In some aspects, the complexing agent comprises a glycol, a carboxylic acid, or a combination thereof.

DETAILED DESCRIPTION OF THE EMBODIMENTS

Overview

Figure 1:
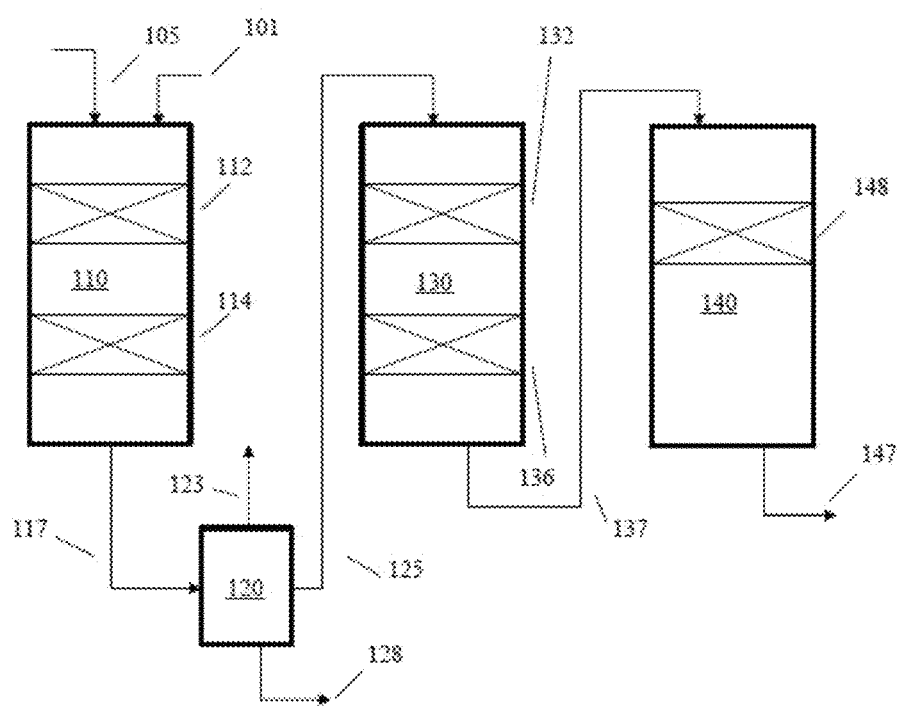
FIG. 1 shows an example of a configuration for hydroprocessing of a distillate boiling range feed.

In various aspects, methods for regenerating and/or rejuvenating catalysts, particularly dewaxing catalysts are provided herein as well as regenerated and/or rejuvenated catalysts produced by the methods described herein. The regenerated and/or rejuvenated catalysts may be advantageously reused for performing dewaxing of diesel boiling range fractions. Dewaxing, such as trim dewaxing, can provide diesel boiling range fuels with improved cold flow properties at desirable yields. However, as discussed above, hydrotreatment (HDT) activity and dewaxing activity of dewaxing catalysts present in a hydrotreatment reactor decreases during hydroprocessing as coke accumulates on the catalysts. Typically, spent catalysts are disposed of or sent to a third party for metals reclamation; thus, requiring the production of fresh catalyst for use in the hydrotreatment reactor. During the reclamation process, the catalyst support, e.g., a zeolite, is destroyed, and the catalyst metals are recovered. Consequently, fresh catalyst must be produced from materials, such as zeolites, base metals and/or noble metals.

It has been unexpectedly discovered that HDT activity and dewaxing activity can be substantially restored for spent catalysts, such as dewaxing catalysts, by performing a combination of regeneration and rejuvenation steps on the spent catalyst. As used herein, the term "spent catalyst" refers to catalyst material with coke formation thereon. "Spent catalyst" also refers to catalyst material having reduced HDT activity including reduced hydrodesulfurization (HDS) activity and/or reduced hydrodenitrogenation (HDN) activity, and/or reduced dewaxing activity following use of the catalyst during hydrotreatment including dewaxing as compared to fresh catalyst. As used herein, the term "coke" material refers to primarily carbon- and hydrogen-containing material (e.g., low hydrogen content hydrocarbons) that may be absorbed on a catalyst. During the regeneration step, at least a portion of coke may be removed from the spent catalyst by calcining the spent catalyst in air as well as, optionally, calcining the spent catalyst in an inert gas, such as nitrogen and/or argon. In addition to the removal of at least a portion of the coke on the spent catalyst, the calcining of the spent catalyst may transform in the metals present in the spent catalyst to metal oxides. Following regeneration, the calcined catalyst may be rejuvenated by contacting the calcined catalyst with a solution comprising a complexing agent, such as citric acid, at a suitable temperature and for a suitable amount of time so that the metal oxides may be complexed with the complexing agent, re-dissolved into the solution, and re-dispersed onto the catalyst support.

Catalyst Regeneration

In various aspects, a regeneration step can be performed by calcining a spent catalyst in the presence of air at a suitable temperature and for a suitable time to remove at least a portion of the coke present on the spent catalyst to form a calcined catalyst. Optionally, prior to calcining the spent catalyst in the presence of air, at least a portion of residual hydrocarbons may be removed from the spent catalyst. For example, following hydroprocessing and/or dewaxing in a reactor, residual fluid hydrocarbons may remain on the spent catalyst. In some aspects, it may be desirable to remove the residual fluid hydrocarbons so that the spent catalyst particles do not adhere together during the calcining. Thus, the spent catalyst may be contacted with air and/or nitrogen, for example, at a temperature of about 15° C. to about 50° C., in order to substantially dry the spent catalyst. It is contemplated herein, that such a drying step to remove residual hydrocarbons may be not necessary. For example, if a rotary calciner is used during calcining a drying step may not be necessary. The flow of gas used for calcining may be countercurrent to the flow of spent catalyst. Alternatively, the spent catalyst may be provided for regeneration already substantially dry.

In various aspects, the spent catalyst may be calcined in the presence of air and optionally, in the presence of an inert gas, such as but not limited to nitrogen and/or argon. Depending on the amount of coke present on the spent catalyst, the spent catalyst may be calcined in the presence of air and optionally, an inert gas (e.g., nitrogen, argon) at a temperature of at least about 300° C., at least about 370° C., at least about 400° C., at least about 450° C., at least about 500° C., at least about 550° C., at least about 600° C., at least about 650° C., at least about 680° C., at least about 700° C., or up to about 710° C. In a particular embodiment, the spent catalyst may be calcined in the presence of air and optionally, an inert gas (e.g., nitrogen, argon) at a temperature not exceeding about 680° C. Additionally or alternatively, the spent catalyst may be calcined in the presence of air and optionally, an inert gas (e.g., nitrogen, argon) at a temperature of about 300° C. to about 710° C., about 370° C. to about 710° C. or about 400° C. to about 550° C. It is contemplated herein that the calcining of the spent catalyst (e.g., in air, nitrogen, argon etc.) described herein may be performed at a constant temperature, a varied temperature or a combination thereof. For example, the calcining may begin at a lower temperature (e.g., 400° C.), which may then be incrementally increased over the course of the calcining until a maximum temperature is achieved (e.g., 550° C.).

Further, depending on the amount of coke present on the spent catalyst and the above-described temperatures at which the spent catalyst is calcined, the spent catalyst may be calcined in the presence of air and optionally, an inert gas (e.g., nitrogen, argon) for at least about 30 minutes, at least about 1.0 hour, at least about 2.0 hours, at least about 4.0 hours, at least about 8.0 hours, at least about 12 hours, at least about 16 hours, at least about 20 hours or about 24 hours. In particular, the spent catalyst may be calcined in the presence of air and optionally, an inert gas (e.g., nitrogen, argon) for at least about 30 minutes. Additionally or alternatively, the spent catalyst may be calcined in the presence of air and optionally, an inert gas (e.g., nitrogen, argon) for about 30 minutes to about 24 hours, about 1.0 hour to about 20 hours, about 2.0 hours to about 12 hours or about 2.0 hour to about 8 hours.

During the regeneration step described herein, at least about 5.0 wt %, at least about 10 wt %, at least about 20 wt %, at least about 30 wt %, at least about 40 wt %, at least about 50 wt %, at least about 60 wt %, at least about 70 wt %, at least about 80 wt %, at least about 90 wt %, at least about 95 wt %, or about 100 wt % of the coke may be removed from the spent catalyst. For example, about 5.0 wt % to about 100 wt %, about 5.0 wt % to about 95 wt %, about 5.0 wt % to about 90 wt %, about 5.0 wt % to about 70 wt %, about 5.0 wt % to about 60 wt %, about 10 wt % to about 100 wt %, about 10 wt % to about 95 wt %, about 10 wt % to about 80 wt %, about 10 wt % to about 60 wt %, about 30 wt % to about 100 wt %, about 30 wt % to about 95 wt %, about 30 wt % to about 80 wt %, about 30 wt % to about 60 wt %, or about 5.0 wt % to about 90 wt % of the coke may be removed from the spent catalyst. In particular, about 5.0 wt % to about 95 wt % of the coke may be removed from the spent catalyst.

In other aspects, methods for removing coke from a spent catalyst are provided. The method may comprise optionally removing at least a portion of residual hydrocarbons on the spent catalyst as described herein, for example, by contacting the spent catalyst with air and/or nitrogen to dry the spent catalyst. The method may further comprise calcining the spent catalyst as described herein, for example, in the presence of an inert gas (e.g., nitrogen, argon) under suitable conditions as described herein (e.g., at a temperature of about 370° C. to about 710° C. and/or for at least about 30 minutes) to remove at least a portion of coke present on the spent catalyst. The spent catalyst may also be calcined in the presence of air under suitable conditions as described (e.g., at a temperature of about 370° C. to about 710° C. and/or for at least about 30 minutes) to remove at least a further portion of coke present on the spent catalyst to form a calcined catalyst (also referred to as a regenerated catalyst). In various aspects, the method removes coke in an amount as described herein, for example, at least about 5.0 wt % to about 95 wt %.

In various aspects, the spent catalyst may be as further described herein. For example, the spent catalyst may comprise at least one Group 8-10 base metal and at least one Group 6 metal on a support comprising a zeolite framework structure.

In still other aspects, a regenerated catalyst formed according to the regeneration methods described above is also provided herein.

Catalyst Rejuvenation

In various aspects, a rejuvenation step may be performed on the calcined catalyst. The rejuvenation step may comprise contacting the calcined catalyst with a solution comprising a complexing agent under suitable conditions to form a modified catalyst. The calcined catalyst may be contacted with the solution via any suitable method, for example, via spray impregnation, incipient wetness, organic acid solution impregnation and/or organic acid solution soaking. The rejuvenation step described herein is performed on a calcined catalyst, but it is also contemplated herein that the rejuvenation step may be performed on a spent catalyst, which has not been regenerated according to any of the above-described methods.

As discussed above, contacting the calcined catalyst with a solution comprising a complexing agent under suitable conditions allows metal oxides present on the calcined catalyst to complex with the complexing agent. The solution may comprise any suitable solvent, for example, water, an alcohol or a glycol. Preferably, the solution may be an aqueous solution complexing agent. Suitable complexing agents may comprise an organic compound comprising 2 to 10 carbons and having a ratio of carbon atoms to oxygen atoms of about 2 to about 0.6. The complexing agent may be an organic acid. Non-limiting examples of suitable complexing agents include pyruvic acid, levulinic acid, 2-ketogulonic acid, keto-gluconic acid, thioglycolic acid, 4-acetylbutyric acid, 1,3-acetonedicarboxylic acid, 3-oxo propanoic acid, 4-oxo butanoic acid, 2,3-diformyl succinic acid, 5-oxo pentanoic acid, 4-oxo pentanoic acid, ethyl glyoxylate, glycolic acid, glyoxylic acid, glucose, glycine, oxamic acid, glyoxylic acid 2-oxime, ethylenediaminetetraacetic acid, nitrilotriacetic acid, N-methylaminodiacetic acid, iminodiacetic acid, diglycolic acid, malic acid, gluconic acid, acetylacetone, citric acid, and combinations thereof. In some aspects, the complexing agent may comprise a glycol, a carboxylic acid, or a combination thereof. Preferably, the complexing agent may be glyoxylic acid, oxalacetic acid, 2-ketogulonic acid, alpha-ketoglutaric acid, 2-ketobutyric acid, pyruvic acid, keto-gluconic acid, thioglycolic acid, glycolic acid, and combinations thereof. In some aspects, the complexing agent can be glyoxylic acid, gluconic acid, oxalacetic acid, or a combination thereof. In other aspects, the complexing agent can be an organic acid that contains a —COOH functional group and at least one additional functional group selected from carboxylic acid: —COOH, hydroximate acid: —NOH—C=O, hydroxo: —OH, keto: —C=O, amine: —NH$_2$, amide: —CO—NH$_2$, imine: —CNOH, epoxy: =COC=, or thiol: —SH. In some aspects, the complexing agent can be a bidentate ligand.

In various aspects, the calcined catalyst may be contacted with a solution comprising a complexing agent at any suitable temperature, preferably at a temperature below the boiling point of the solution comprising the complexing agent. For example, the calcined catalyst may be contacted with a solution comprising a complexing agent at a temperature of at least about 15° C., at least about 20° C., at least about 30° C., at least about 40° C., at least about 50° C., at least about 60° C., at least about 70° C., at least about 80° C., at least about 90° C., at least about 100° C., at least about 125° C., at least about 150° C., at least about 175° C., at least about 200° C., at least about 250° C. or at least about 300° C. In a particular embodiment, the calcined catalyst may be contacted with the aqueous solution at a temperature below 100° C. Additionally or alternatively, the calcined catalyst may be contacted with a solution comprising a complexing agent at temperature of about 15° C. to about 300° C., about 15° C. to about 200° C., about 15° C. to about 100° C., or about 20° C. to about 90° C. In a particular embodiment, the calcined catalyst may be contacted with a solution comprising a complexing agent at a temperature from about 15° C. to less than the boiling point of the solution.

Further, in combination with the above-described temperatures, the calcined catalyst may be contacted with a solution comprising a complexing agent for at least about 15 minutes, at least about 30 minutes, at least about 60 minutes, at least about 90 minutes, at least about 120 minutes, at least about 180 minutes, about 240 minutes, at least about 480 minutes, at least about 720 minutes, at least about 1080 minutes, or about 1440 minutes. Additionally or alternatively, the calcined catalyst may be contacted with a solution comprising a complexing agent for about 15 minutes to about 1440 minutes, about 15 minutes to about 1080 minutes, about 15 minutes to about 720 minutes, about 30 minutes to about 480 minutes, about 30 minutes to about 240 minutes, about 30 minutes to about 180 minutes, about 30 minutes to about 120 minutes or about 120 minutes to about 240 minutes.

In various aspects, during the rejuvenation step, a molar ratio of complexing agent to at least one base metal (to be further described below, e.g., Ni, Co) present in the calcined catalyst may be at least about 1.25, at least about 1.50, at least about 2.0, at least about 2.5, at least about 3.0, at least about 4.0, at least about 5.0, at least about 6.0, at least about 7.0, at least about 8.0, at least about 9.0 or 10. For example, the molar ratio of complexing agent to at least one base metal present in the calcined catalyst may be from about 1.25 to about 10, about 1.25 to about 9.0, about 1.25 to about 8.0, about 1.25 to about 7.0, about 1.25 to about 6.0, about 1.25 to about 5.0, about 1.25 to about 4.0, about 1.25 to about 3.0, about 2.0 to about 10, about 2.0 to about 9.0, about 2.0 to about 8.0, about 2.0 to about 7.0, about 2.0 to about 6.0, about 2.0 to about 5.0, about 2.0 to about 4.0, or about 2.0 to about 3.0. In particular, the molar ratio of complexing agent to at least one base metal present in the calcined catalyst may be from about 1.25 to about 10, or about 1.5 to about 5.0. Additionally or alternatively, the solution volume may be about 100% or less (e.g., about 80%, about 85%, about 90%, about 95%) of the maximum water absorption capacity of the calcined catalyst.

Following contact with the the solution comprising the complexing agent, the modified catalyst may be dried, for example, in air, an inert atmosphere (e.g., nitrogen, argon), under a vacuum, under suitable conditions to form a rejuvenated catalyst, wherein the metal complexes may be removed and redeposited on the catalyst support. In various aspects, the modified catalyst may be dried at a temperature of at least about 50° C., at least about 75° C., at least about 100° C., at least about 125° C., at least about 150° C., at least about 175° C., at least about 200° C., at least about 225° C., or about 250° C. Additionally or alternatively, the modified catalyst may be dried at temperature of about 50° C. to about 250° C., about 75° C. to about 200° C., or about 100° C. to about 150° C.

Further, in combination with the above-described temperatures, the modified catalyst may be dried for at least about 30 minutes, at least about 60 minutes, at least about 90 minutes, at least about 120 minutes, at least about 180 minutes, at least about 240 minutes, at least about 480 minutes, at least about 720 minutes, at least about 1080 minutes, or about 1440 minutes. Additionally or alternatively the modified catalyst may be dried for about 30 minutes to about 1440 minutes, about 30 minutes to about 1080 minutes, about 30 minutes to about 720 minutes, about 30 minutes to about 480 minutes, about 30 minutes to about 240 minutes, about 30 minutes to about 180 minutes, about 30 minutes to about 120 minutes or about 120 minutes to about 240 minutes.

Advantageously, following the regeneration and/or rejuvenation methods described herein, the catalyst may have recovered hydrodesulfurization (HDS) activity, recovered hydrodenitrogenation (HDN) activity and/or recovered dewaxing activity. In various aspects, the catalyst may have, singularly or in combination, recovered HDS activity, recovered HDN activity or recovered dewaxing activity of at least about 50%, at least about 60%, at least about 70%, at least about 80%, at least about 90%, at least about 95%, or about 100%. In particular, the catalyst may have, singularly or in combination, recovered HDS activity, recovered HDN activity or recovered dewaxing activity of at least about 90%. Additionally or alternatively, the rejuvenated catalyst may have, singularly or in combination, recovered HDS activity, recovered HDN activity or recovered dewaxing activity of about 50% to about 100%, about 70% to about 100%, about 80% to about 100%, or about 90% to about 100%.

In other aspects, methods for rejuvenating a spent catalyst are provided herein. The method may comprise contacting a solution comprising a complexing agent as described herein (e.g., organic compound comprising 2-10 carbon atoms and a carbon atom to oxygen atom ratio of about 0.6 to about 2, such a carboxylic acid and/or a glycol) with the spent catalyst under suitable conditions (e.g., at a temperature of 15° C. to less than the boiling point of the solution and/or for about 30 minutes to about 120 minutes) to form a modified catalyst as described herein. In various aspects, a molar ratio of complexing agent as described herein to a base metal (to be further described below, e.g., Ni, Co) present in the calcined catalyst may be as described herein, for example, a molar ratio of at least about 1.25 or about 1.25 to about 10.

The method may further comprise drying the modified catalyst as described herein under suitable conditions as described herein (e.g., at a temperature of about 50° C. to about 250° C.) to form a rejuvenated catalyst.

In various aspects, the spent catalyst may be as further described herein below. For example, the spent catalyst may comprise at least one Group 8-10 base metal and at least one Group 6 metal on a support comprising a zeolite framework structure.

In still other aspects, a rejuvenated catalyst formed according to the rejuvenation methods described above is also provided herein Spent Catalyst Any suitable base metal containing spent catalyst may be regenerated and/or rejuvenated according to the above described methods. As discussed above, the spent catalyst may comprise coke material. In various aspects, the spent catalyst can include at least one base metal from Groups 8-10 (Columns 8-10 of IUPAC periodic table; also known as a Group VIII metal) as hydrogenation or catalytic metals. Examples of suitable Group 8-10 base metals include noble and non-noble metals. Examples of suitable noble metals include Pt, Pd, Rh, Ir, Ru, Os, Ag, Au and combinations thereof. Preferably, the Group 8-10 base metal may be a non-noble metal, such as Co, Ni, Fe and combinations thereof. In various aspects, the spent catalyst may include at least two Group 8-10 base metals, for example, optionally, a noble metal and a non-noble metal, two non-noble metals or two noble metals. The spent catalyst can further include at least one Group 6 metal (Column 6 of IUPAC periodic table; also known as a Group VI metal) as a hydrogenation metal, preferably Mo and/or W. In some optional aspects, other metals from Groups 6-12 (Columns 6-12 IUPAC periodic table), preferably additional metals from Group 6 and 8-10 may be present in the spent catalyst. In various aspects, a molar ratio of a Group 8-10 base metal (e.g., Co and/or Ni) to a Group 6 metal (e.g., Mo and/or W) may be about 0.1 to about 10.

In various aspects, spent catalyst metals may be present on a support comprising one or more zeolites. Examples of suitable zeolites include, but are not limited to, zeolitic framework structures having a 10-member ring pore channel as the largest pore size channel in the framework structure. Optionally, the largest pore size channel can be a 1-D channel, 2-D channel or a 3-D channel. Suitable framework structure types can include, but are not limited to, a) zeolites where the largest pore size channel has a pore size from about 4.8 Angstroms to about 6.0 Angstroms; b) zeolites where the largest pore size channel corresponds to a 10 member ring; c) zeolitic framework structures of framework type MRE, MEL, MFI, MTT, EUO, FAU, FER, AEL, AFO, SFF, STF, TON or USY; d) zeolites having the zeolite structure corresponding to ZSM-11 and/or having the disordered zeolite structure corresponding to ZSM-48 and/or zeolites having the zeolite structure corresponding to ZSM-5 and/or zeolites having the zeolite structure corresponding to ZSM-23; or e) combinations thereof. In a particular embodiment, the zeolite framework structure may selected from the group consisting of MRE, MEL, MFI, MTT, EUO, FAU, FER, USY, a combination thereof.

In various aspects, the zeolitic framework structure can comprise an MEL framework structure, the zeolitic framework structure further comprising a) a molar ratio of silica to alumina of about 35 to about 55; b) an alpha value of at least about 380; c) a total surface area of at least about 350 $m^2/g$, or d) a combination thereof.

In this discussion and the claims below, a zeolite is defined to refer to a crystalline material having a porous framework structure built from tetrahedra atoms connected by bridging oxygen atoms. Examples of known zeolite frameworks are given in the "Atlas of Zeolite Frameworks" published on behalf of the Structure Commission of the International Zeolite Association", $6^{th}$ revised edition, Ch. Baerlocher, L. B. McCusker, D. H. Olson, eds., Elsevier, New York (2007) and the corresponding web site, http://www.iza-structure.org/databases/. Under this definition, a zeolite can refer to aluminosilicates having a zeolitic framework type as well as crystalline structures containing oxides of heteroatoms different from silicon and aluminum. Such heteroatoms can include any heteroatom generally known to be suitable for inclusion in a zeolitic framework, such as gallium, boron, germanium, phosphorus, zinc, antimony, tin, and/or other transition metals that can substitute for silicon and/or aluminum in a zeolitic framework.

The spent catalyst can be self-bound and/or can be optionally bound with a separate binder or matrix material prior to use. Binders can be resistant to temperatures of the use desired and are attrition resistant. Binders may be catalytically active or inactive and include other zeolites, other inorganic materials such as clays and metal oxides such as alumina, silica, silica-alumina, titania and zirconia. Clays may be kaolin, bentonite and montmorillonite and are commercially available. They may be blended with other materials such as silicates. Other binary porous matrix materials in addition to silica-aluminas include materials such as silica-magnesia, silica-thoria, silica-zirconia, silica-beryllia and silica-titania. Ternary materials such as silica-alumina-magnesia, silica-alumina-thoria and silica-alumina-zirconia can also be suitable for use as binders. The matrix can be in the form of a co-gel. In some aspects, the base metal dewaxing catalysts can be formulated using a low surface area binder, a low surface area binder represents a binder with a surface area of about 150 $m^2/g$ or less, or about 130 $m^2/g$ or less, or about 100 $m^2/g$ or less, or about 80 $m^2/g$ or less, or about 70 $m^2/g$ or less.

The amount of zeolite in a support including a binder can be from about 30 wt % zeolite to about 100 wt % zeolite relative to the combined weight of binder and zeolite. For example, the amount of zeolite can be about 30 wt % to about 100 wt %, or about 30 wt % to about 90 wt %, or about 30 wt % to about 80 wt %, or about 30 wt % to about 70 wt %, or about 50 wt % to about 100 wt %, or about 50 wt % to about 90 wt %, or about 50 wt % to about 80 wt %, or about 50 wt % to about 70 wt %, or about 60 wt % to about 90 wt %, or about 60 wt % to about 80 wt %, or about 60 wt % to about 70 wt %.

Processing Using Regenerated and/or Rejuvenated Catalyst—Feedstock

After regenerating and/or rejuvenating spent catalyst as described herein, the regenerated and/or rejuvenated catalyst can be used for dewaxing of various feeds, such as diesel boiling range feeds, distillate boiling range feeds, and/or lubricant boiling range feeds. It is further contemplated herein that prior to using the regenerated and/or rejuvenated catalyst as a dewaxing catalyst, the base metals in the regenerated and/or rejuvenated catalyst may be optionally sulfided prior to use to form a sulfided base metal catalyst. The sulfidation of the metals can be performed by any convenient method, such as gas phase sulfidation or liquid phase sulfidation. Sulfidation is generally carried out by contacting a catalyst precursor (such as a catalyst precursor that includes metals complexed by a dispersion agent and/or metals in the form of metal oxides) with a sulfur containing compound, such as elemental sulfur, hydrogen sulfide or polysulfides. Hydrogen sulfide is a convenient sulfidation agent for gas phase sulfidation, and can be incorporated into a gas phase sulfidation atmosphere containing hydrogen in an amount of about 0.1 wt % to 10 wt %. Sulfidation can also be carried out in the liquid phase utilizing a combination of a polysulfide, such as a dimethyl disulfide spiked hydrocarbon stream, and hydrogen. The sulfidation can be performed at a convenient sulfidation temperature, such as a temperature from 150° C. to 500° C. The sulfidation can be performed at a convenient sulfidation pressure, such as a pressure of 100 psig to 1000 psig or more. The sulfidation time can vary depending on the sulfidation conditions, so that sulfidation times of 1 hour to 72 hours can be suitable. The resulting catalyst may also be steamed prior to use.

One way of defining a feedstock is based on the boiling range of the feed. One option for defining a boiling range is to use an initial boiling point for a feed and/or a final boiling point for a feed. Another option, which in some instances may provide a more representative description of a feed, is to characterize a feed based on the amount of the feed that boils at one or more temperatures. For example, a "T5" boiling point for a feed is defined as the temperature at which 5 wt % of the feed will boil off. Similarly, a "T95" boiling point is a temperature at 95 wt % of the feed will boil. A suitable ASTM method can be used for characterization of boiling points (including fractional boiling points), such as ASTM D2887.

As defined herein, a diesel boiling range feed can have a boiling range based on a T5 distillation point and/or a T10 distillation point, and a T95 distillation point and/or a T90 distillation point. In various aspects, a diesel boiling range feed or fraction is defined as a feed or fraction with a T5 distillation point of at least 177° C. and a T95 distillation point of 371° C. or less, or a T5 distillation point of at least 177° C. and a T90 distillation point of 371° C. or less, or a T10 distillation point of at least 177° C. and a T95 distillation point of 371° C. or less, or a T10 distillation point of at least 177° C. and a T90 distillation point of 371° C. or less. Additionally or alternately, a diesel boiling range fraction within a feed can be defined as the portion of a feed having a boiling range from 177° C. (as an initial boiling point) to 371° C. (as a final boiling point). As defined herein, a lubricant boiling range feed can having a boiling range based on a T5 distillation point and/or a T10 distillation point, and a T95 distillation point and/or a T90 distillation point. In various aspects, a lubricant boiling range feed or fraction is defined as a feed or fraction with a T5 distillation point of at least 371° C. and a T95 distillation point of 510° C. or less, or a T5 distillation point of at least 371° C. and a T90 distillation point of 510° C. or less, or a T10 distillation point of at least 371° C. and a T95 distillation point of 510° C. or less, or a T10 distillation point of at least 371° C. and a T90 distillation point of 510° C. or less. Additionally or alternately, a lubricant boiling range fraction within a feed can be defined as the portion of a feed having a boiling range from 371° C. (as an initial boiling point) to 510° C. (as a final boiling point). As defined herein, a distillate boiling range can be defined that represents a combination of the diesel and lubricant boiling ranges. Thus, a distillate boiling range feed can be defined as a feed or fraction with a T5 distillation point of at least 177° C. and a T95 distillation point of 510° C. or less, or a T5 distillation point of at least 177° C. and a T90 distillation point of 510° C. or less, or a T10 distillation point of at least 177° C. and a T95 distillation point of 510° C. or less, or a T10 distillation point of at least 177° C. and a T90 distillation point of 510° C. or less. Additionally or alternately, a distillate boiling range fraction within a feed can be defined as the portion of a feed having a boiling range from 177° C. (as an initial boiling point) to 510° C. (as a final boiling point).

A wide range of petroleum and chemical feedstocks can be hydroprocessed in reaction systems that include a dewaxing catalyst (e.g., regenerated and/or rejuvenated catalyst) formed using a plurality of structure directing agents. Suitable feedstocks include whole and reduced petroleum crudes, atmospheric and vacuum residua, propane deasphalted residua, e.g., brightstock, cycle oils, FCC tower bottoms, gas oils, including vacuum gas oils and coker gas oils, light to heavy distillates including raw virgin distillates, hydrocrackates, hydrotreated oils, slack waxes, Fischer-Tropsch waxes, raffinates, and mixtures of these materials.

In embodiments involving an initial sulfur removal stage prior to hydrocracking, the sulfur content of the feed can be at least 300 ppm by weight of sulfur, or at least 1000 wppm, or at least 2000 wppm, or at least 4000 wppm, or at least 10,000 wppm, or at least 20,000 wppm. In other embodiments, including some embodiments where a previously hydrotreated and/or hydrocracked feed is used, the sulfur content can be 2000 wppm or less, or 1000 wppm or less, or 500 wppm or less, or 100 wppm or less.

In some aspects, the regenerated and/or rejuvenated catalyst can be used to provide an improved amount of hydrotreating activity (desulfurization activity and/or denitrogenation activity) when exposed to a diesel and/or lubricant boiling range feed under effective dewaxing conditions and/or effective hydrotreating conditions. The regenerated and/or rejuvenated catalyst can further provide a comparable level of cloud point reduction under such conditions. Effective conditions for catalytic dewaxing and hydrotreating are described in greater detail below. Optionally, additional benefit in hydrotreating activity can be obtained when the base metal dewaxing catalyst (e.g., regenerated and/or rejuvenated catalyst) comprises a low surface area binder, such as a low surface area alumina binder. Optionally, additional benefit in hydrotreating activity can be obtained by performing dewaxing and/or hydrotreatment at higher temperatures, such as at least about 680° F. (360° C.), or at least about 700° F. (371° C.), or at least about 716° F. (380° C.). In combination with typical end of run temperatures, the additional benefit in cloud point reduction can be achieved for dewaxing temperatures of about 360° C. to about 450° C., or about 360° C. to about 425° C., or about 370° C. to about 450° C., or about 370° C. to about 425° C., or about 380° C. to about 450° C., or about 380° C. to about 425° C.

For reaction system configurations where a diesel boiling range product is produced based in part on exposure of a feed to a base metal dewaxing catalyst (e.g., regenerated and/or rejuvenated catalyst), the diesel boiling range product can have a cloud point of about −10° C. or less, or about −20° C. or less, or about −30° C. or less, or about −40° C. or less. Additionally or alternately, the diesel boiling range product can have a sulfur content of about 100 wppm of sulfur or less, or about 50 wppm or less, or about 25 wppm or less, or about 15 wppm or less. Additionally or alternately, the diesel boiling range product can have a nitrogen content of about 100 wppm of nitrogen or less, or about 50 wppm or less, or about 25 wppm or less, or about 15 wppm or less.

Examples of Reaction Systems for Hydroprocessing

In the discussion herein, a stage can correspond to a single reactor or a plurality of reactors. Optionally, multiple parallel reactors can be used to perform one or more of the processes, or multiple parallel reactors can be used for all processes in a stage. Each stage and/or reactor can include one or more catalyst beds containing hydroprocessing catalyst. Note that a "bed" of catalyst in the discussion below can refer to a partial physical catalyst bed. For example, a catalyst bed within a reactor could be filled partially with a hydrocracking catalyst and partially with a dewaxing catalyst including the regenerated and/or rejuvenated catalyst. For convenience in description, even though the two catalysts may be stacked together in a single catalyst bed, the hydrocracking catalyst and dewaxing catalyst can each be referred to conceptually as separate catalyst beds.

In the discussion herein, reference will be made to a hydroprocessing reaction system. The hydroprocessing reaction system corresponds to the one or more stages, such as two stages and/or reactors and an optional intermediate separator, that are used to expose a feed to a plurality of catalysts under hydroprocessing conditions. The plurality of catalysts can be distributed between the stages and/or reactors in any convenient manner, with some preferred methods of arranging the catalyst described herein.

Various types of hydroprocessing can be used in the production of distillate fuels and/or lubricant base oils. In some aspects, diesel boiling range fuel products can be formed by exposing a diesel and/or distillate boiling range feed to hydrotreating catalyst and a base metal dewaxing catalyst (e.g., regenerated and/or rejuvenated catalyst) under effective hydrotreating conditions. Optionally, the hydrotreating catalyst and the base metal dewaxing catalyst (e.g., regenerated and/or rejuvenated catalyst) can be located in the same reactor. Optionally, the hydrotreating catalyst and the base metal dewaxing catalyst (e.g., regenerated and/or rejuvenated catalyst) can be located within the same catalyst bed in a reactor. Optionally, the effluent (or at least a portion thereof) from exposing the feed to the hydrotreating catalyst and the base metal dewaxing catalyst (e.g., regenerated and/or rejuvenated catalyst) can be exposed to an aromatic saturation catalyst. This type of configuration can allow for production of a diesel boiling range product with reduced sulfur content, reduced nitrogen content, and/or improved cold flow properties.

In other aspects, diesel boiling range fuel products can be formed by exposing a diesel and/or distillate boiling range feed to hydrotreating catalyst under effective hydrotreating conditions and a base metal dewaxing catalyst (e.g., regenerated and/or rejuvenated catalyst) under effective dewaxing conditions. Optionally, the hydrotreating catalyst (e.g., regenerated and/or rejuvenated catalyst) and the base metal dewaxing catalyst can be located in the same reactor. Optionally, the effluent (or at least a portion thereof) from exposing the feed to the hydrotreating catalyst and the base metal dewaxing catalyst (e.g., regenerated and/or rejuvenated catalyst) can be exposed to an aromatic saturation catalyst. This type of configuration can allow for production of a diesel boiling range product with reduced sulfur content, reduced nitrogen content, and/or improved cold flow properties.

In still other aspects, diesel boiling range products and lubricant boiling range products can be formed by exposing a lubricant and/or distillate boiling range feed to hydrotreating catalyst under effective hydrotreating conditions; hydrocracking catalyst under effective hydrocracking conditions; and a base metal dewaxing catalyst (e.g., regenerated and/or rejuvenated catalyst) under effective dewaxing conditions. Optionally, a separation can be performed on hydrotreated effluent and/or hydrocracked effluent prior to at least one additional stage of hydrotreatment and/or hydrocracking. This separation can correspond to a separation to remove light ends ($C_{4-}$), or this separation can also allow for separation of any fuels boiling range material formed during the exposure to the hydrotreating and/or hydrocracking catalyst(s). Optionally, a separation can be performed on hydrotreated effluent and/or hydrocracked effluent prior to at least one stage of catalytic dewaxing. This separation can correspond to a separation to remove light ends ($C_{4-}$), or this separation can also allow for separation of any fuels boiling range material formed during the exposure to the hydrotreating and/or hydrocracking catalyst(s). Optionally, the effluent (or at least a portion thereof) from exposing the feed to the base metal dewaxing catalyst (e.g., regenerated and/or rejuvenated catalyst) can be exposed to an aromatic saturation catalyst. This type of configuration can allow for production of diesel boiling range product and/or lubricant boiling range product with reduced sulfur content, reduced nitrogen content, and/or improved cold flow properties.

FIG. 1 shows an example of a reaction system for hydroprocessing of a feed for fuels and/or lubricant base oil production. In the example shown in FIG. 1, a suitable feed 105 can be introduced into a first reactor (or reactors) 110. Hydrogen can also be introduced at various locations within the reaction system, such as hydrogen-containing stream 101. Reactor 110 is schematically shown as including at least one bed 112 of hydrotreating catalyst and at least one bed 114 of hydrocracking catalyst. Either hydrotreating catalyst bed (or beds) 112 or hydrocracking bed (or beds) 114 can be optional. After exposing the feed to the hydrotreating and/or hydrocracking catalyst under effective conditions, the resulting first effluent 117 can be passed into a separator 120. In some aspects, separator 120 can be a gas-liquid type separator for removing contaminant gases 123 generated during hydrotreatment and/or hydrocracking, such as $H_2S$ or $NH_3$. This can allow subsequent stages or catalyst beds in the reaction system to operate as "sweet" reaction stages. In other aspects, separator 120 can allow for separation of liquid hydrocarbon products 128 from the effluent that are below a desired cut point. For example, for a system for lubricant base oil production, separator 120 can allow for separation of both diesel and naphtha boiling range compounds, optionally as one or more separate streams, such as one or more diesel streams, one or more kerosene or jet streams, and/or one or more naphtha streams. As another example, for a system for diesel fuel production, separator 120 might separate out diesel and lower boiling range compounds, or separator 120 may separate out naphtha boiling range compounds while retaining diesel with the primary process flow.

After passing through separator 120, the remaining portion 125 of the effluent can be passed into a second reactor (or reactors) 130. In the example shown in FIG. 1, reactor 130 includes at least one (optional) bed 132 of a hydrotreating and/or hydrocracking catalyst and at least one bed 136 of a dewaxing catalyst (e.g., regenerated and/or rejuvenated catalyst). The resulting dewaxed effluent 137 can then be passed into a third reactor (or reactors) 140 for exposure to at least one (optional) bed 148 of hydrofinishing and/or aromatic saturation catalyst. Either the dewaxed effluent 137 or the hydrofinished effluent 147 can be fractionated (not shown) in order to form one or more product streams, such as lubricant base oils, distillate fuel fractions, or naphtha fuel fractions.

In some alternative aspects, a reaction system for fuels production can include fewer reactors and/or stages than the system shown in FIG. 1. For example, for hydrotreatment and dewaxing of a diesel boiling range feed and/or distillate boiling range feed for production of diesel boiling range products, just reactor 110 could be used. In such an example, a suitable feed 105 can be introduced into a first reactor (or reactors) 110. Hydrogen can also be introduced at various locations within the reaction system, such as hydrogen-containing stream 101. In this type of example, reactor 110 could include at least one bed 112 of hydrotreating catalyst and at least one bed 114 of base metal dewaxing catalyst (e.g., regenerated and/or rejuvenated catalyst). Alternatively, just bed(s) 112 could be included, with base metal dewaxing catalyst (e.g., regenerated and/or rejuvenated catalyst) being included in the beds along with the hydrotreating catalyst.

Hydrotreatment Conditions

Hydrotreatment can typically be used to reduce the sulfur, nitrogen, and aromatic content of a feed. The catalysts used for hydrotreatment can include conventional hydroprocessing catalysts, for example those that comprise at least one non-noble Group 8-10 metal (Columns 8-10 of IUPAC periodic table), such as Fe, Co, and/or Ni, optionally Co and/or Ni; and at least one Group 6 metal (Column 6 of IUPAC periodic table), such as Mo and/or W. Such hydroprocessing catalysts optionally include transition metal sulfides that are impregnated or dispersed on a refractory support or carrier such as alumina and/or silica. The support or carrier itself typically has no significant/measurable catalytic activity. Substantially carrier- or support-free catalysts, commonly referred to as bulk catalysts, generally have higher volumetric activities than their supported counterparts.

The conventional hydrotreating catalysts can either be in bulk form or in supported form. In addition to alumina and/or silica, other suitable support/carrier materials can include, but are not limited to, zeolites, titania, silica-titania, and titania-alumina. Suitable aluminas are porous aluminas such as gamma or eta having average pore sizes from 50 to 200 Å, or 75 to 150 Å; a surface area from 100 to 300 m$^2$/g, or 150 to 250 m$^2$/g; and a pore volume of from 0.25 to 1.0 cm$^3$/g, or 0.35 to 0.8 cm$^3$/g. More generally, any convenient size, shape, and/or pore size distribution for a catalyst suitable for hydrotreatment of a distillate (including lubricant base oil) boiling range feed in a conventional manner may be used. It is noted that more than one type of hydroprocessing catalyst can be used in one or multiple reaction vessels.

In the hydrotreating catalysts, the at least one non-noble Group 8-10 metal, can be present in an amount ranging from 2 wt % to 40 wt %, or from 4 wt % to 15 wt %. %. The at least one Group 6 metal, in oxide form, can be present in an amount ranging from 2 wt % to 70 wt %, or for supported catalysts from 6 wt % to 40 wt % or from 10 wt % to 30 wt %. These weight percents are based on the total weight of the catalyst. Suitable metal catalysts can include cobalt/molybdenum (1-10% Co as oxide, 10-40% Mo as oxide), nickel/molybdenum (1-10% Ni as oxide, 10-40% Co as oxide), or nickel/tungsten (1-10% Ni as oxide, 10-40% W as oxide) on alumina, silica, silica-alumina, or titania.

The hydrotreatment is carried out in the presence of hydrogen. A hydrogen stream is, therefore, fed or injected into a vessel or reaction zone or hydroprocessing zone in which the hydroprocessing catalyst is located. Hydrogen, which is contained in a hydrogen "treat gas," is provided to the reaction zone. Treat gas can be either pure hydrogen or a hydrogen-containing gas, which is a gas stream containing hydrogen in an amount that is sufficient for the intended reaction(s), optionally including one or more other gasses (e.g., nitrogen and light hydrocarbons such as methane), and which will not adversely interfere with or affect either the reactions or the products. Impurities, such as H$_2$S and NH$_3$ are undesirable and would typically be removed from the treat gas before it is conducted to the reactor. In aspects where the treat gas stream introduced into a reaction stage contains components other than hydrogen, the treat gas can contain at least 50 vol. %, or at least 75 vol. % hydrogen, or at least 90 vol % hydrogen, or at least 95 vol % hydrogen, or at least 99 vol % hydrogen.

Hydrotreating conditions can include temperatures of 200° C. to 450° C., or 315° C. to 425° C.; pressures of 250 psig (1.8 MPag) to 5000 psig (34.6 MPag) or 300 psig (2.1 MPag) to 3000 psig (20.7 MPag); and liquid hourly space velocities (LHSV) of 0.1 hr$^{-1}$ to 10 hr$^{-1}$; and hydrogen treat rates of 100 scf/B (17.8 m$^3$/m$^3$) to 10,000 scf/B (1781 m$^3$/m$^3$), or 500 (89 m$^3$/m$^3$) to 10,000 scf/B (1781 m$^3$/m$^3$). Hydrogen can be supplied co-currently with the input feed to the hydrotreatment reactor and/or reaction zone or separately (and optionally counter-current) via a separate gas conduit to the hydrotreatment zone.

Hydrocracking Conditions

In various aspects, the reaction conditions in the reaction system can be selected to generate a desired level of conversion of a feed. Conversion of the feed can be defined in terms of conversion of molecules that boil above a temperature threshold to molecules below that threshold. The conversion temperature can be any convenient temperature, such as 700° F. (371° C.). In an aspect, the amount of conversion in the stage(s) of the reaction system can be selected to enhance diesel production while achieving a substantial overall yield of fuels. The amount of conversion can correspond to the total conversion of molecules within any stage of the fuels hydrocracker or other reaction system that is used to hydroprocess the lower boiling portion of the feed from the vacuum distillation unit. Suitable amounts of conversion of molecules boiling above 700° F. to molecules boiling below 700° F. include converting at least 25% of the 700° F.+ portion of the feedstock to the stage(s) of the reaction system, or at least 40% of the 700° F.+ portion, or at least 50%, or at least 60%, or at least 70%, or at least 75%. Additionally or alternately, the amount of conversion for the reaction system can be 85% or less, or 80% or less, or 75% or less, or 70% or less, or 60% or less, or 50% or less. Each of the above lower bounds on the amount of conversion is explicitly contemplated in conjunction with each of the above upper bounds. Still larger amounts of conversion may also produce a suitable hydrocracker bottoms for forming lubricant base oils, but such higher conversion amounts will also result in a reduced yield of lubricant base oils. Reducing the amount of conversion can increase the yield of lubricant base oils, but reducing the amount of conversion to below the ranges noted above may result in hydrocracker bottoms that are not suitable for formation of Group II, Group II+, or Group III lubricant base oils.

In order to achieve a desired level of conversion, a reaction system can include at least one hydrocracking catalyst. Hydrocracking catalysts typically contain sulfided base metals on acidic supports, such as amorphous silica alumina, cracking zeolites such as USY, or acidified alumina. Often these acidic supports are mixed or bound with other metal oxides such as alumina, titania or silica. Examples of suitable acidic supports include acidic molecular sieves, such as zeolites or silicoaluminophophates. One example of suitable zeolite is USY, such as a USY zeolite with cell size of 24.25 Angstroms or less. Additionally or alternately, the catalyst can be a low acidity molecular sieve, such as a USY zeolite with a Si to Al ratio of at least 20, and preferably at least 40 or 50. Zeolite Beta is another example of a potentially suitable hydrocracking catalyst. Non-limiting examples of metals for hydrocracking catalysts include metals or combinations of metals that include at least one Group 8-10 metal (Columns 8-10 on the IUPAC periodic table), such as nickel, nickel-cobalt-molybdenum, cobalt-molybdenum, nickel-tungsten, nickel-molybdenum, and/or nickel-molybdenum-tungsten. Additionally or alternately, hydrocracking catalysts with noble metals can also be used. Non-limiting examples of noble metal catalysts include those based on platinum and/or palladium. Support materials which may be used for both the noble and non-noble metal catalysts can comprise a refractory oxide material such as alumina, silica, alumina-silica, kieselguhr, diatomaceous earth, magnesia, zirconia, or combinations thereof, with alumina, silica, alumina-silica being the most common (and preferred, in one embodiment).

In various aspects, the conditions selected for hydrocracking for fuels production and/or lubricant base stock production can depend on the desired level of conversion, the level of contaminants in the input feed to a hydrocracking stage, and potentially other factors. For example, hydrocracking conditions in a first stage (such as a sour stage) and/or a second stage (such as a sweet stage) can be selected to achieve a desired level of conversion in the reaction system. A hydrocracking process in the first stage (or otherwise under sour conditions) can be carried out at a temperatures of 550° F. (288° C.) to 840° F. (449° C.), hydrogen partial pressures of from 250 psig to 5000 psig (1.8 MPag to 34.6 MPag), liquid hourly space velocities of from 0.05 $h^{-1}$ to 10 and hydrogen treat gas rates of from 35.6 $m^3/m^3$ to 1781 $m^3/m^3$ (200 SCF/B to 10,000 SCF/B). In other embodiments, the conditions can include temperatures in the range of 600° F. (343° C.) to 815° F. (435° C.), hydrogen partial pressures of from 500 psig to 3000 psig (3.5 MPag-20.9 MPag), and hydrogen treat gas rates of from 213 $m^3/m^3$ to 1068 $m^3/m^3$ (1200 SCF/B to 6000 SCF/B). The LHSV relative to only the hydrocracking catalyst can be from 0.25 $h^1$ to 50 $h^{-1}$, such as from 0.5 $h^{-1}$ to 20 $h^{-1}$, and preferably from 1.0 $h^{-1}$ to 4.0 $h^{-1}$.

In some aspects, a portion of the hydrocracking catalyst can be contained in a second reactor stage. In such aspects, a first reaction stage of the hydroprocessing reaction system can include one or more hydrotreating and/or hydrocracking catalysts. The conditions in the first reaction stage can be suitable for reducing the sulfur and/or nitrogen content of the feedstock. A separator can then be used in between the first and second stages of the reaction system to remove gas phase sulfur and nitrogen contaminants. One option for the separator is to simply perform a gas-liquid separation to remove contaminant. Another option is to use a separator such as a flash separator that can perform a separation at a higher temperature. Such a high temperature separator can be used, for example, to separate the feed into a portion boiling below a temperature cut point, such as 350° F. (177° C.) or 400° F. (204° C.), and a portion boiling above the temperature cut point. In this type of separation, the naphtha boiling range portion of the effluent from the first reaction stage can also be removed, thus reducing the volume of effluent that is processed in the second or other subsequent stages. Of course, any low boiling contaminants in the effluent from the first stage would also be separated into the portion boiling below the temperature cut point. If sufficient contaminant removal is performed in the first stage, the second stage can be operated as a "sweet" or low contaminant stage.

Still another option can be to use a separator between the first and second stages of the hydroprocessing reaction system that can also perform at least a partial fractionation of the effluent from the first stage. In this type of aspect, the effluent from the first hydroprocessing stage can be separated into at least a portion boiling below the distillate (such as diesel) fuel range, a portion boiling in the distillate fuel range, and a portion boiling above the distillate fuel range. The distillate fuel range can be defined based on a conventional diesel boiling range, such as having a lower end cut point temperature of at least 350° F. (177° C.) or at least 400° F. (204° C.) to having an upper end cut point temperature of 700° F. (371° C.) or less or 650° F. (343° C.) or less. Optionally, the distillate fuel range can be extended to include additional kerosene, such as by selecting a lower end cut point temperature of at least 300° F. (149° C.).

In aspects where the inter-stage separator is also used to produce a distillate fuel fraction, the portion boiling below the distillate fuel fraction includes, naphtha boiling range molecules, light ends, and contaminants such as $H_2S$. These different products can be separated from each other in any convenient manner. Similarly, one or more distillate fuel fractions can be formed, if desired, from the distillate boiling range fraction. The portion boiling above the distillate fuel range represents the potential lubricant base oils. In such aspects, the portion boiling above the distillate fuel range is subjected to further hydroprocessing in a second hydroprocessing stage.

A hydrocracking process in a second stage (or otherwise under non-sour conditions) can be performed under conditions similar to those used for a first stage hydrocracking process, or the conditions can be different. In an embodiment, the conditions in a second stage can have less severe conditions than a hydrocracking process in a first (sour) stage. The temperature in the hydrocracking process can be 40° F. (22° C.) less than the temperature for a hydrocracking process in the first stage, or 80° F. (44° C.) less, or 120° F. (66° C.) less. The pressure for a hydrocracking process in a second stage can be 100 psig (690 kPa) less than a hydrocracking process in the first stage, or 200 psig (1380 kPa) less, or 300 psig (2070 kPa) less. Additionally or alternately, suitable hydrocracking conditions for a second (non-sour) stage can include, but are not limited to, conditions similar to a first or sour stage. Suitable hydrocracking conditions can include temperatures of 550° F. (288° C.) to 840° F. (449° C.), hydrogen partial pressures of from 250 psig to 5000 psig (1.8 MPag to 34.6 MPag), liquid hourly space velocities of from 0.05 to 10 $h^{-1}$, and hydrogen treat gas rates of from 35.6 $m^3/m^3$ to 1781 $m^3/m^3$ (200 SCF/B to 10,000 SCF/B). In other embodiments, the conditions can include temperatures in the range of 600° F. (343° C.) to 815° F. (435° C.), hydrogen partial pressures of from 500 psig to 3000 psig (3.5 MPag-20.9 MPag), and hydrogen treat gas rates of from 213 $m^3/m^3$ to 1068 $m^3/m^3$ (1200 SCF/B to 6000 SCF/B). The liquid hourly space velocity can vary depending on the relative amount of hydrocracking catalyst used versus dewaxing catalyst (e.g., regenerated and/or rejuvenated catalyst). Relative to the combined amount of hydrocracking and dewaxing catalyst (e.g., regenerated and/or rejuvenated catalyst), the LHSV can be from 0.2 $h^{-1}$ to 10 such as from 0.5 $h^{-1}$ to 5 $h^{-1}$ and/or from 1 $h^{-1}$ to 4 $h^{-1}$. Depending on the relative amount of hydrocracking catalyst and dewaxing catalyst (e.g., regenerated and/or rejuvenated catalyst) used, the LHSV relative to only the hydrocracking catalyst can be from 0.25 $h^{-1}$ to 50 $h^{-1}$, such as from 0.5 $h^{-1}$ to 20 $h^{-1}$, and preferably from 1.0 to 4.0 $h^{-1}$.

In still another embodiment, the same conditions can be used for hydrotreating and hydrocracking beds or stages, such as using hydrotreating conditions for both or using hydrocracking conditions for both. In yet another embodiment, the pressure for the hydrotreating and hydrocracking beds or stages can be the same.

Catalytic Dewaxing Process

In some aspects, the regenerated and/or rejuvenated catalyst as described herein can be used as the dewaxing catalyst and be included in the same stage and/or the same reactor and/or the same bed as a hydrotreating catalyst. The dewaxing catalyst (e.g., regenerated and/or rejuvenated catalyst) can be mixed with the hydrotreating catalyst and/or the dewaxing catalyst (e.g., regenerated and/or rejuvenated catalyst) can be downstream (within the same bed or in a different bed) relative to at least a portion of the hydrotreating catalyst or relative to substantially all of the hydrotreating catalyst.

In other aspects, a dewaxing catalyst (e.g., regenerated and/or rejuvenated catalyst) can be located in a bed downstream from any hydrocracking catalyst stages and/or any hydrocracking catalyst present in a stage. This can allow the dewaxing to occur on molecules that have already been hydrotreated or hydrocracked to remove a significant fraction of organic sulfur- and nitrogen-containing species. The dewaxing catalyst (e.g., regenerated and/or rejuvenated catalyst) can be located in the same reactor as at least a portion of the hydrocracking catalyst in a stage. Alternatively, the effluent from a reactor containing hydrocracking catalyst, possibly after a gas-liquid separation, can be fed into a separate stage or reactor containing the dewaxing catalyst. In still other aspects, the dewaxing catalyst (e.g., the regenerated and/or rejuvenated catalyst) can be used in a catalyst bed prior to (i.e., upstream relative to the process flow) at least one bed of hydrotreating and/or hydrocracking catalyst.

In various aspects, at least a portion of the dewaxing catalyst can correspond to the regenerated and/or rejuvenated catalyst as described herein. Such a dewaxing catalyst can be used alone, or in conjunction with one or more other additional dewaxing catalysts.

Additional suitable dewaxing catalysts can include molecular sieves such as crystalline aluminosilicates (zeolites). In an embodiment, the molecular sieve can comprise, consist essentially of, or be ZSM-5, ZSM-11, ZSM-22, ZSM-23, ZSM-35, ZSM-48, zeolite Beta, TON (Theta-1), or a combination thereof, for example ZSM-23 and/or ZSM-48, or ZSM-48 and/or zeolite Beta. Optionally, molecular sieves that are selective for dewaxing by isomerization as opposed to cracking can be used, such as ZSM-48, zeolite Beta, ZSM-23, or a combination thereof. Additionally or alternately, the molecular sieve can comprise, consist essentially of, or be a 10-member ring 1-D molecular sieve. Examples include EU-1, ZSM-35 (or ferrierite), ZSM-11, ZSM-57, NU-87, SAPO-11, ZSM-48, ZSM-23, and ZSM-22; for example EU-2, EU-11, ZBM-30, ZSM-48, or ZSM-23; such as ZSM-48. Note that a zeolite having the ZSM-23 structure with a silica to alumina ratio of from 20:1 to 40:1 can sometimes be referred to as SSZ-32. Other molecular sieves that are isostructural with the above materials include NU-10, EU-13, KZ-1, and NU-23. Optionally, the additional dewaxing catalyst(s) can include a binder for the molecular sieve, such as alumina, titania, silica, silica-alumina, zirconia, or a combination thereof, for example alumina and/or titania or silica and/or zirconia and/or titania.

In some aspects, the additional dewaxing catalyst(s) used in processes according to the invention can be catalysts with a low ratio of silica to alumina. For example, for ZSM-48, the ratio of silica to alumina in the zeolite can be less than 200:1, such as less than 110:1, or less than 100:1, or less than 90:1, or less than 75:1. In various embodiments, the ratio of silica to alumina can be from 50:1 to 200:1, such as 60:1 to 160:1, or 70:1 to 100:1.

In various aspects, the additional dewaxing catalyst(s) can further include a metal hydrogenation component. The metal hydrogenation component can typically be a Group 6 and/or a Group 8-10 metal, such as a Group 8-10 noble metal. For example, the metal hydrogenation component can be Pt, Pd, or a mixture thereof. In an alternative aspect, the metal hydrogenation component can be a combination of a non-noble Group 8-10 metal with a Group 6 metal. Suitable combinations can include Ni, Co, or Fe with Mo or W, preferably Ni with Mo or W.

The metal hydrogenation component may be added to an additional catalyst in any convenient manner. One technique for adding the metal hydrogenation component is by incipient wetness. For example, after combining a zeolite and a binder, the combined zeolite and binder can be extruded into catalyst particles. These catalyst particles can then be exposed to a solution containing a suitable metal precursor. Alternatively, metal can be added to the catalyst by ion exchange, where a metal precursor is added to a mixture of zeolite (or zeolite and binder) prior to extrusion.

The amount of metal in an additional dewaxing catalyst can be at least 0.1 wt % based on catalyst, or at least 0.15 wt %, or at least 0.2 wt %, or at least 0.25 wt %, or at least 0.3 wt %, or at least 0.5 wt % based on catalyst. The amount of metal in the catalyst can be 20 wt % or less based on catalyst, or 10 wt % or less, or 5 wt % or less, or 2.5 wt % or less, or 1 wt % or less. For aspects where the metal is Pt, Pd, another Group 8-10 noble metal, or a combination thereof, the amount of metal can be from 0.1 to 5 wt %, preferably from 0.1 to 2 wt %, or 0.25 to 1.8 wt %, or 0.4 to 1.5 wt %. For embodiments where the metal is a combination of a non-noble Group 8-10 metal with a Group 6 metal, the combined amount of metal can be from 0.5 wt % to 20 wt %, or 1 wt % to 15 wt %, or 2.5 wt % to 10 wt %.

The additional dewaxing catalysts useful in processes according to the invention can also include a binder. In some aspects, the additional dewaxing catalysts can be formulated using a low surface area binder. A low surface area binder represents a binder with a surface area of 100 $m^2/g$ or less, or 80 $m^2/g$ or less, or 70 $m^2/g$ or less. The amount of zeolite in a catalyst formulated using a binder can be from 30 wt % zeolite to 90 wt % zeolite relative to the combined weight of binder and zeolite. Preferably, the amount of zeolite is at least 50 wt % of the combined weight of zeolite and binder, such as at least 60 wt % or from 65 wt % to 80 wt %. Optionally, the dewaxing catalyst can include a binder for the molecular sieve, such as alumina, titania, silica, silica-alumina, zirconia, or a combination thereof. In a preferred embodiment, the binder can be alumina. In another embodiment, the binder can be alumina, titania, or a combination thereof. In still another embodiment, the binder can be titania, silica, zirconia, or a combination thereof.

A zeolite can be combined with binder in any convenient manner. For example, a bound catalyst can be produced by starting with powders of both the zeolite and binder, combining and mulling the powders with added water to form a mixture, and then extruding the mixture to produce a bound catalyst of a desired size. Extrusion aids can also be used to modify the extrusion flow properties of the zeolite and binder mixture.

Process conditions in a catalytic dewaxing zone can include a temperature of from 200 to 450° C., preferably 270 to 400° C., a hydrogen partial pressure of from 1.8 MPag to 34.6 MPag (250 psig to 5000 psig), preferably 4.8 MPag to 20.7 MPag, and a hydrogen treat gas rate of from 35.6 m³/m³ (200 SCF/B) to 1781 m³/m³ (10,000 scf/B), preferably 178 m³/m³ (1000 SCF/B) to 890.6 m³/m³ (5000 SCF/B). In still other embodiments, the conditions can include temperatures in the range of 600° F. (343° C.) to 815° F. (435° C.), hydrogen partial pressures of from 500 psig to 3000 psig (3.6 MPag-20.7 MPag), and hydrogen treat gas rates of from 213 m³/m³ to 1068 m³/m³ (1200 SCF/B to 6000 SCF/B). These latter conditions may be suitable, for example, if the dewaxing stage is operating under sour conditions. The liquid hourly space velocity (LHSV) can be from 0.2 h$^{-1}$ to 10 h$^{-1}$, such as from 0.5 h$^{-1}$ to 5 and/or from 1 h$^{-1}$ to 4 h$^{-1}$.

Additionally or alternately, the conditions for dewaxing can be selected based on the conditions for a preceding reaction in the stage, such as hydrocracking conditions or hydrotreating conditions. Such conditions can be further modified using a quench between previous catalyst bed(s) and the bed for the dewaxing catalyst (e.g., regenerated and/or rejuvenated catalyst). Instead of operating the dewaxing process at a temperature corresponding to the exit temperature of the prior catalyst bed, a quench can be used to reduce the temperature for the hydrocarbon stream at the beginning of the dewaxing catalyst bed. One option can be to use a quench to have a temperature at the beginning of the dewaxing catalyst bed that is the same as the outlet temperature of the prior catalyst bed. Another option can be to use a quench to have a temperature at the beginning of the dewaxing catalyst bed that is at least 10° F. (6° C.) lower than the prior catalyst bed, or at least 20° F. (11° C.) lower, or at least 30° F. (16° C.) lower, or at least 40° F. (21° C.) lower.

As still another option, the dewaxing catalyst (e.g., regenerated and/or rejuvenated catalyst) in the final reaction stage can be mixed with another type of catalyst, such as hydrotreating catalyst, in at least one bed in a reactor. As yet another option, a hydrocracking catalyst and a dewaxing catalyst (e.g., regenerated and/or rejuvenated catalyst) can be co-extruded with a single binder to form a mixed functionality catalyst.

Hydrofinishing and/or Aromatic Saturation Process

In some aspects, a hydrofinishing and/or aromatic saturation stage can also be provided. The hydrofinishing and/or aromatic saturation can occur after the last hydrocracking or dewaxing stage. The hydrofinishing and/or aromatic saturation can occur either before or after fractionation. If hydrofinishing and/or aromatic saturation occurs after fractionation, the hydrofinishing can be performed on one or more portions of the fractionated product, such as being performed on the bottoms from the reaction stage (i.e., the hydrocracker bottoms). Alternatively, the entire effluent from the last hydrocracking or dewaxing process can be hydrofinished and/or undergo aromatic saturation.

In some situations, a hydrofinishing process and an aromatic saturation process can refer to a single process performed using the same catalyst. Alternatively, one type of catalyst or catalyst system can be provided to perform aromatic saturation, while a second catalyst or catalyst system can be used for hydrofinishing. Typically a hydrofinishing and/or aromatic saturation process will be performed in a separate reactor from dewaxing or hydrocracking processes for practical reasons, such as facilitating use of a lower temperature for the hydrofinishing or aromatic saturation process. However, an additional hydrofinishing reactor following a hydrocracking or dewaxing process but prior to fractionation could still be considered part of a second stage of a reaction system conceptually.

Hydrofinishing and/or aromatic saturation catalysts can include catalysts containing Group 6 metals, Group 8-10 metals, and mixtures thereof. In an embodiment, preferred metals include at least one metal sulfide having a strong hydrogenation function. In another embodiment, the hydrofinishing catalyst can include a Group 8-10 noble metal, such as Pt, Pd, or a combination thereof. The mixture of metals may also be present as bulk metal catalysts wherein the amount of metal is 30 wt. % or greater based on catalyst. Suitable metal oxide supports include low acidic oxides such as silica, alumina, silica-aluminas or titania, preferably alumina. The preferred hydrofinishing catalysts for aromatic saturation will comprise at least one metal having relatively strong hydrogenation function on a porous support. Typical support materials include amorphous or crystalline oxide materials such as alumina, silica, and silica-alumina. The support materials may also be modified, such as by halogenation, or in particular fluorination. The metal content of the catalyst is often as high as 20 weight percent for non-noble metals. In an embodiment, a preferred hydrofinishing catalyst can include a crystalline material belonging to the M41S class or family of catalysts. The M41S family of catalysts are mesoporous materials having high silica content. Examples include MCM-41, MCM-48 and MCM-50. A preferred member of this class is MCM-41. If separate catalysts are used for aromatic saturation and hydrofinishing, an aromatic saturation catalyst can be selected based on activity and/or selectivity for aromatic saturation, while a hydrofinishing catalyst can be selected based on activity for improving product specifications, such as product color and polynuclear aromatic reduction.

Hydrofinishing conditions can include temperatures from 125° C. to 425° C., preferably 180° C. to 280° C., a hydrogen partial pressure from 500 psig (3.4 MPa) to 3000 psig (20.7 MPa), preferably 1500 psig (10.3 MPa) to 2500 psig (17.2 MPa), and liquid hourly space velocity from 0.1 hr$^{-1}$ to 5 hr$^{-1}$ LHSV, preferably 0.5 hr$^{-1}$ to 2.0 hr$^{-1}$. Additionally, a hydrogen treat gas rate of from 35.6 m³/m³ to 1781 m³/m³ (200 SCF/B to 10,000 SCF/B) can be used.

In some optional aspects where the feed includes a lubricant boiling range portion (i.e., a portion of the feed has a boiling point greater than 371° C.), after hydroprocessing the bottoms from the hydroprocessing reaction system can have a viscosity index (VI) of at least 95, such as at least 105 or at least 110. In such optional aspects, the amount of saturated molecules in the bottoms from the hydroprocessing reaction system can be at least 90%, while the sulfur content of the bottoms is less than 300 wppm. Thus, in such optional aspects, the bottoms from the hydroprocessing reaction system can be suitable for use as a Group II and/or Group III lubricant base oil.

EXAMPLES

Example 1—Preparation of Fresh and Spent Catalyst

The catalyst used in these examples was 1/16 quadrulobe NiMo—ZSM-11 catalyst prepared according to the methods described in the examples of U.S. Provisional Application Nos. 62/270,234 and 62/270,213. In particular the fresh NiMo—ZSM-11 catalyst ("Fresh Catalyst") comprised: ~65 wt % ZSM-11; ~35 wt % high surface area alumina binder; and was impregnated with: ~3 wt % Ni, 14 wt % Mo and citric acid at a molar ratio of ~2 citric acid:1 Ni.

Figure 2:
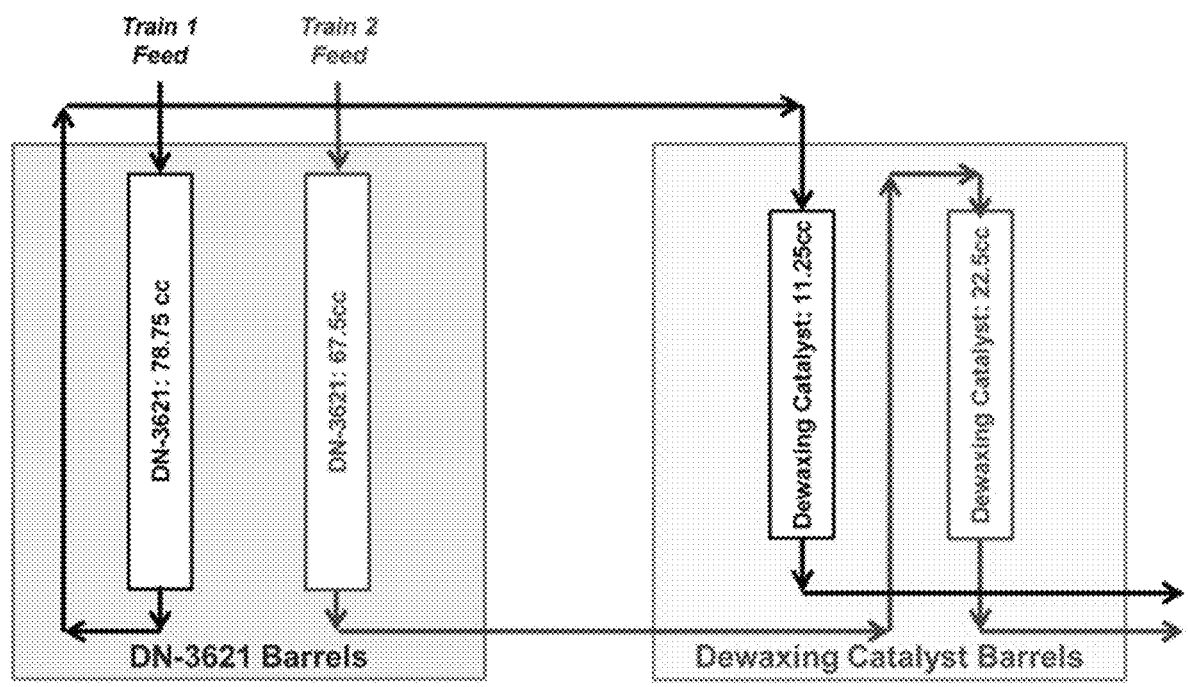
FIG. 2 shows a schematic of a 5-month long pilot plant study distillate trim dewaxing process which produced spent catalyst via a first reactor train and a second reactor train.

This fresh catalyst was used in a distillate trim dewaxing process during a 5-month long pilot plant study to produce spent catalyst collected at the end of the study via a first reactor train and a second reactor train, as shown in FIG. 2. During the distillate trim dewaxing process, various crude oil and refinery stream feeds were hydrotreated in a reactor with a hydrotreating catalyst (DN-3621 obtained from Criterion) followed by dewaxing with the NiMo—ZSM-11 catalyst for the first reactor train and the second reactor train. The first reactor train had a 1:7 ratio of NiMo—ZSM-11 catalyst to hydrotreating catalyst (DN-3621), and the second reactor train had a 1:3 ratio of NiMo—ZSM-11 catalyst to hydrotreating catalyst (DN-3621). The properties of the feeds used during the distillate trim dewaxing process study are shown below in Table 1.

TABLE 1

| Properties | Feed 1 | Feed 2 | Feed 3 | Feed 4 | Feed 5 | Feed 6 |
|---|---|---|---|---|---|---|
| Feed Properties | | | | | | |
| S, wt. % (D2622-1/CLN) | 0.201 | 1.02 | 1.30 | 1.08 | 1.20 | 1.33 |
| N, ppm (G905/PGC) | 62.8 | 422 | 383 | 260 | 242 | 593 |
| Cloud Point, °C. (B3964/PGC, PhaseTech) | −19.7 | 13.1 | −5.2 | −4.3 | 5.8 | — |
| Cloud Point, °C. (B7346/PGC, MPP) | — | 12.4 | −4.0 | −2.6 | 5.6 | 8.3 |
| API (G22/PGC) | 35.05 | 29.0 | 26.64 | 28.86 | 31.26 | 29.5 |
| Density at 60 F. (calc), g/cc | 0.850 | 0.882 | 0.895 | 0.882 | 0.869 | 0.879 |
| Aromatics by SFC, wt. % (HDHA_SFC/CLN) | | | | | | |
| PARAFFINS | — | 23.03 | 21.38 | 21.92 | 24.57 | — |
| 1-RING NAPHTHENES | — | 12.45 | 12.19 | 13.18 | 20.46 | — |
| 2+ RING NAPHTHENES | — | 20.37 | 18.93 | 20 | 20.76 | — |
| 1 RING AROMATICS | — | 21.89 | 17.87 | 18.47 | 19.22 | — |
| 2 RING AROMATICS | — | 11.53 | 15.06 | 12.7 | 6.77 | — |
| 3+ RINGS AROMATICS | — | 10.73 | 14.57 | 13.73 | 8.23 | — |
| TOTAL NAPHTHENES | — | 32.82 | 31.12 | 33.18 | 41.22 | — |
| TOTAL AROMATICS | — | 44.14 | 47.5 | 44.9 | 34.21 | — |
| GCD, F (B2887/PGC) | | | | | | |
| IBP | 306 | 286 | 290 | 287 | 293 | 289 |
| 5 wt. % | 364 | 417 | 413 | 418 | 410 | 398 |
| 10 wt. % | 396 | 472 | 449 | 457 | 465 | 441 |
| 20 wt. % | 442 | 531 | 492 | 507 | 529 | 497 |
| 30 wt. % | 476 | 581 | 530 | 542 | 575 | 545 |
| 40 wt. % | 505 | 628 | 562 | 573 | 610 | 585 |
| 50 wt. % | 534 | 669 | 589 | 596 | 646 | 623 |
| 60 wt. % | 564 | 699 | 619 | 620 | 675 | 657 |
| 70 wt. % | 589 | 724 | 652 | 648 | 700 | 687 |
| 80 wt. % | 617 | 749 | 683 | 676 | 724 | 714 |
| 90 wt. % | 651 | 779 | 720 | 711 | 747 | 750 |
| 95 wt. % | 672 | 801 | 746 | 739 | 760 | 776 |
| FBP | 724 | 852 | 795 | 795 | 784 | 842 |
| Hydrogen, wt. % (1747/CLN) | 13.16 | 12.36 | 11.8 | 12.26 | 12.8 | — |
| Cetane Number, (M1656/CLN) | — | 50.2 | 41.7 | 45.6 | 53 | — |
| Kinematic Viscosity, 40 C., mm2/s (D445-3/ASV) | — | 6.379 | 4.268 | 4.464 | 5.475 | — |
| ASTM Color of Petroleum Products, (D1500-1/ASV) | — | L5.0 | L3.5 | L4.5 | L1.5 | — |

The various conditions tested during the distillate trim dewaxing process study are shown below in Table 2.

TABLE 2

Distillate Trim Dewaxing Conditions

| | Feed 1 | Feed 2 | Feed 3 | | Feed 4 | | | | | Feed 5 | | | |
|---|---|---|---|---|---|---|---|---|---|---|---|---|---|
| Condition | | | | | | | | | | | | | |
| | 1 | 2 | 3 | 4 | 5 | 6 | 7 | 8 | 9 | 10 | 11 | 12 | 13 |
| Start Day (day) | 1 | 4 | 14 | 17 | 25 | 31 | 38 | 43 | 48 | 51 | 54 | 55 | 58 |
| Days On Oil (day) | 3 | 10 | 3 | 8 | 6 | 7 | 5 | 5 | 3 | 3 | 1 | 3 | 3 |
| End Day (day) | 3 | 13 | 16 | 24 | 30 | 37 | 42 | 47 | 50 | 53 | 54 | 57 | 60 |
| DN-3621 Temp. (° F.) | 610 | 625 | 615 | 625 | | | 625 | | | 625 | | 630 | |
| NiMo ZSM-11 Temp. (° F.) | 610 | 640 | 625 | 635 | 300 | 650 | 660 | 680 | 650 | 670 | 670 | 690 | |
| P (psig) | 1100 | 1300 | | 1100 | | 1100 | | | | 1130 | | | |
| Treat gas rate (TGR) (SCFB) | 2300 | 2240 | | 2250 | | 2300 | | | | 3000 | | | |
| H$_2$ Purity (wt %) | 100 | 100 | | 100 | | 100 | | | | 100 | | | |
| LHSV (hr$^{-1}$) | 1 | 0.6 | | 1 | | 1 | | | | 0.75 | | | |

| | Feed 2 | | | | | | | | Feed 6 | | | |
|---|---|---|---|---|---|---|---|---|---|---|---|---|
| Condition | | | | | | | | | | | | |
| | 14 | 15 | 16 | 17 | 18 | 19 | 20 | 21 | 22 | 23 | 24 | 25 |
| Start Day (day) | 61 | 64 | 69 | 73 | 77 | 84 | 93 | 101 | 113 | 119 | 124 | 128 |
| Days On Oil (day) | 3 | 5 | 4 | 4 | 7 | 9 | 8 | 12 | 6 | 5 | 4 | 4 |
| End Day (day) | 63 | 68 | 72 | 76 | 83 | 92 | 100 | 112 | 118 | 123 | 127 | 131 |
| DN-3621 Temp. (° F.) | 625 | | 635 | | 610 | 625 | 635 | 650 | | 660 | | |
| NiMo ZSM-11 Temp. (° F.) | 640 | 650 | 660 | 680 | 680 | 660 | | 680 | 660 | 670 | 680 | 690 |
| P (psig) | | 1300 | | | 800 | | 1300 | | | 1300 | | |
| Treat gas rate (TGR) (SCFB) | | 2240 | | | 2240 | | 2240 | | | 1800 | | |
| H$_2$ Purity (wt %) | | 100 | | | 100 | | 100 | | | 100 | | |
| LHSV (hr$^{-1}$) | | 0.6 | | | 0.6 | | 0.6 | | | 0.7 | | |

Example 2—Determination of Regeneration Protocol

A regeneration protocol was established based on thermogravimetric analyses (TGA) of the spent catalyst. TGA under air and nitrogen was performed on two separate portions of spent catalyst (Sample A and Sample B), respectively, from the first reactor train. TGA under air and nitrogen was also performed on two separate portions of spent catalyst (Sample C and Sample D), respectively, from the second reactor train. The first and second reactor trains were run in parallel during the distillate trim dewaxing process described above. Details about the catalysts and the TGA atmosphere are shown below in Table 3.

TABLE 3

Catalyst Reaction Train and TGA Atmosphere

| Sample | Reaction Train | TGA Atmosphere |
|---|---|---|
| Sample A | 1 | Air |
| Sample B | 1 | Nitrogen |
| Sample C | 2 | Air |
| Sample D | 2 | Nitrogen |

Figure 3:
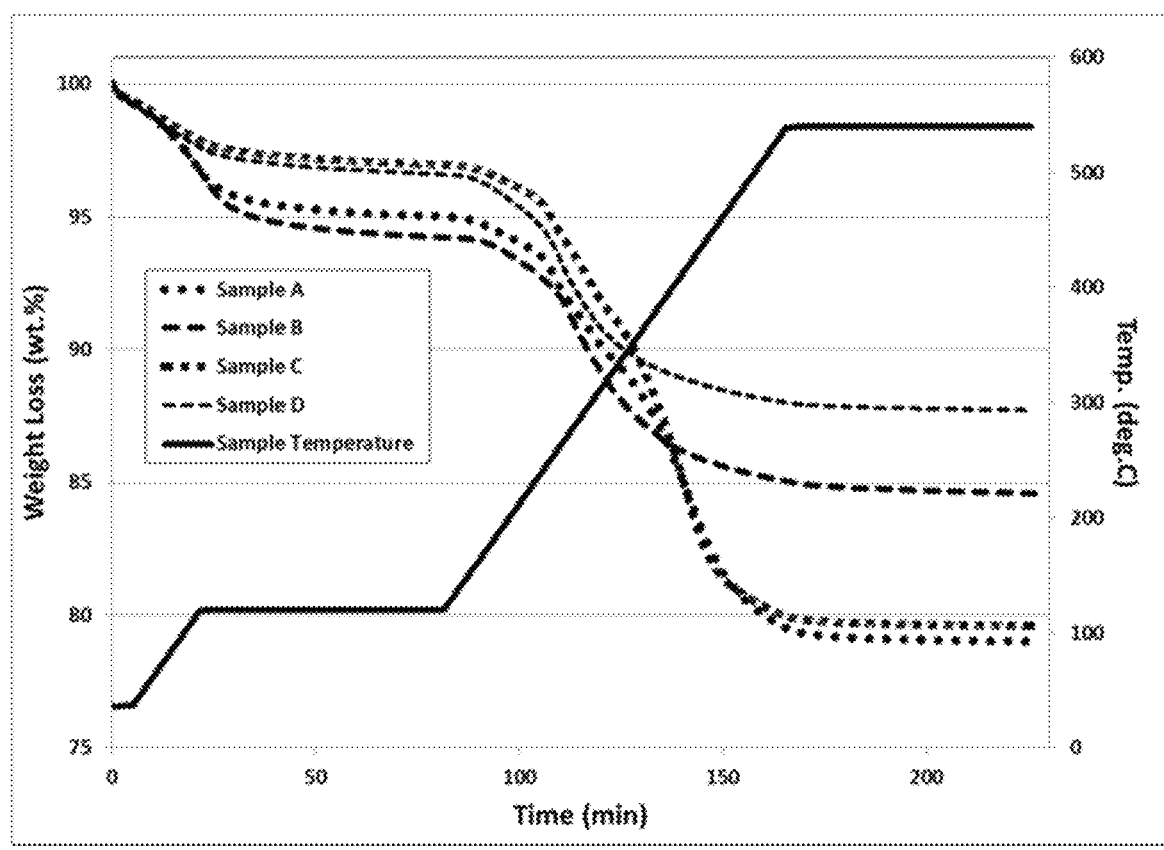
FIG. 3 shows thermogravimetric analyses (TGA) results of various spent catalysts.

The results of the TGA of Samples A-D are shown in FIG. 3. From this analysis, it was determined that calcining spent catalyst in the presence of N$_2$ for ~2 hours at ~1000° F. removed approximately 10 wt % of coke. Further, it was determined that further calcining of the spent catalyst in the presence of air for an additional ~2 hours at ~1000° F. removed the remaining ~5-7 wt % of coke. It is understood herein that the calcination time may vary depending on the amount of coke present on the spent catalyst. Further, calcining time and coke removal may be determined by solids analysis of the calcined sample.

Example 3—Regeneration and Rejuvenation of Spent Catalyst

A portion of the spent catalyst was regenerated and rejuvenated as follows:
1. ~15 cc of spent catalyst was calcined as follows:
   a. for ~2 hours under $N_2$ (~75 cc $N_2$/hr) at ~1,000° F.; and
   b. for an additional ~2 hours under air (~75 cc air/hr) at ~1,000° F. to produce a "calcined catalyst" (also referred to as a regenerated catalyst);
2. the water absorption factor (AF) of the calcined catalyst was measured by determining the weight difference of a catalyst support (the calcined catalyst) before and after water absorption. The water added to the catalyst support (the calcined catalyst) was just enough to wet the support, without flooding or excess water observed on the support or the walls of catalyst prep vessel. For example, 1 g of alumina may absorb about 0.7 g of water. The AF factor is 0.7 g/g, since water density is 1 g/ml, therefore, it can be expressed as 0.7 ml of water/g of support. If less than 0.7 g of water is added to the support, the surface of alumina support still looks dry. If more than 0.7 g is added to the support, it can cause excess water on alumina support surface or the walls of a glass beaker. Besides water, other organic solvents can also be used to measure AF, such as alcohols, glycols, organic acids, etc. The AF of the calcined catalyst was determined to be 0.56 g/g. Once the AF was measured, the calcined catalyst was recovered by drying it overnight (~6-12 hrs) at ~120° C.;
3. ~2 grams of the calcined catalyst were set aside;
4. The remaining portion of the calcined catalyst was divided into two equal portions (i.e., "a first portion" and "a second portion");
5. The first and second portions were impregnated with different concentrations of citric acid to a target 95% water AF of the calcined catalyst as follows:
   a. Impregnation 1
      i. A citric acid water solution targeting 95% of water AF of the calcined catalyst was prepared containing ~0.63 grams of citric acid (2 moles of citric acid/mole of Ni in the catalyst).
      ii. The first portion (1 gram) was pipette-impregnated with the citric acid solution (0.63 grams) and was allowed to soak at ~2 hours at room temperature (~18° C.-25° C.) to form a "first impregnated catalyst."
      iii. The first impregnated catalyst was dried for ~2 hours at ~120° C. producing a "rejuvenated catalyst (2× citric acid)."
   b. Impregnation 2
      i. A citric acid water solution targeting 95% of water AF of the calcined catalyst was prepared containing ~1.26 grams of citric acid (4 moles of citric acid/mole of Ni in the catalyst).
      ii. The second portion was pipette-impregnated with the citric acid solution and was allowed to soak at ~2 hours at room temperature (~18° C.-25° C.) to form a "second impregnated catalyst."
      iii. The second impregnated catalyst was dried for ~2 hours at ~120° C. producing a "rejuvenated catalyst (4× citric acid)."

Physical properties for the fresh catalyst, calcined catalyst, rejuvenated catalyst (2× citric acid), and rejuvenated catalyst (4× citric acid) are shown in Table 4 below.

TABLE 4

Physical Properties of Fresh, Calcined and Rejuvenated Catalysts

| Property | Fresh Catalyst | Calcined Catalyst | Rejuvenated Catalyst (2X Citric Acid) | Rejuvenated Catalyst (4X Citric Acid) |
|---|---|---|---|---|
| Weight (g) | 1.157 | 0.914 | 1.157 | 1.215 |
| Assumed Density (g/cm³) | 0.771 | 0.609 | 0.771 | 0.810 |
| Volume (cm³) | 1.5 | 1.5 | 1.5 | 1.5 |

Figure 4:
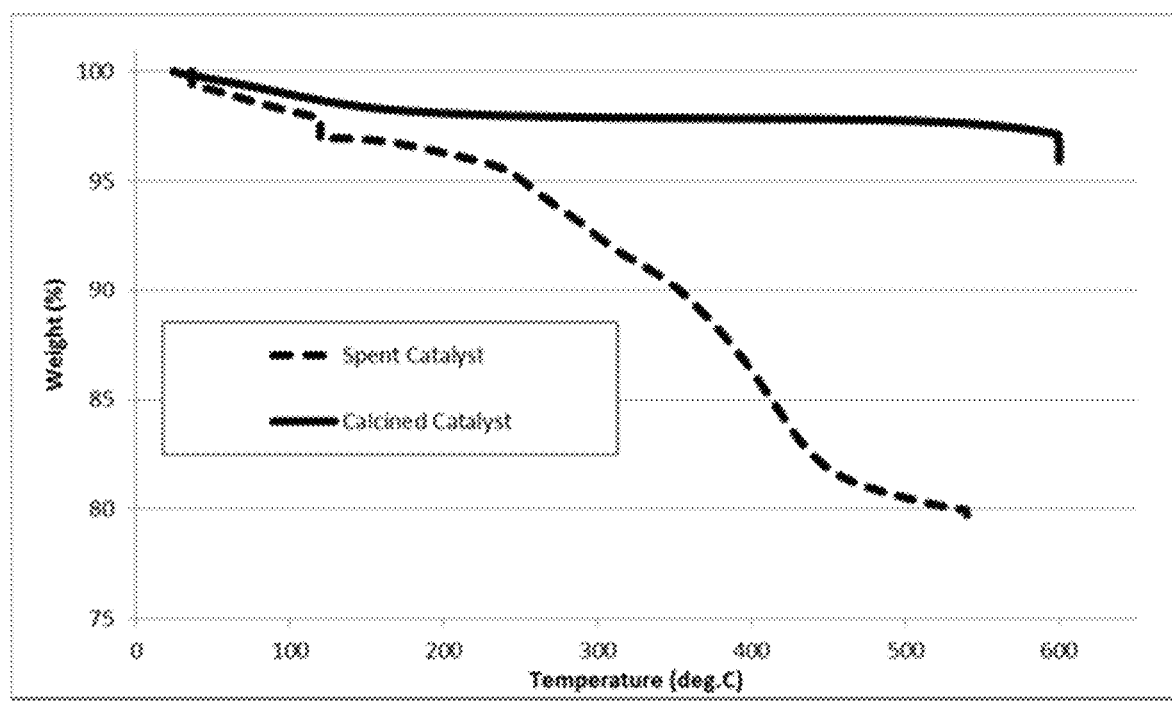
FIG. 4 shows TGA results for spent catalyst and calcined catalyst.

TGA under air was performed on the spent catalyst and the calcined catalyst to determine the amount of coke on the spent catalyst. The TGA results are shown in FIG. 4. It was determined that the spent catalyst contained >~20 wt % coke.

Example 4—Hydrotreating and Dewaxing Activity Evaluation of Catalysts

These catalysts in Table 4 were tested for hydrotreating and dewaxing activity in a tri-phase fixed bed reactor. For the evaluation, the catalyst were sized and loaded into the reactor as 14/20 mesh particles. The reactor was placed in a sandbath to provide isothermal operating conditions. After loading, the catalyst were dried for 2 hours under flowing $N_2$ at ~110° C. and ~600 psig (~4.1 MPag), followed by holding the reactor at ~110° C. and ~4.1 MPag of $H_2$ for roughly 2 hours. Following drying, the sulfidation process was started by performing catalyst wetting at 110° C., 1000 psig (~6.9 MPag), and 2250 SCF/B (~400 $Nm^3/m^3$) of $H_2$ with a light gas oil feed. This was followed by heating the reactor to 204° C., at which point the feed was switched to a spiked light gas oil containing 2.5 wt % sulfur (spiking was performed with dimethyldisulfide) at a LHSV of 2.0 $hr^{-1}$ while maintaining the $H_2$ treat gas flow at ~400 $Nm^3/m^3$. After introducing the spiked light gas oil, the reactor was heated to ~250° C. at a rate of ~28° C./hr under the same liquid and gas flow rates and held for at least ~8 hours. The temperature was then ramped to ~320° C. at ~28° C./hr and held at that temperature for roughly 5 hours. Properties of the distillate feedstock are shown below in Table 5.

TABLE 5

Properties of Distillate Feedstock

| API Gravity | 29.0 |
|---|---|
| Sulfur Content | 1.01 wt % |
| Nitrogen Content | 460 ppm |
| Cloud Point (D5573) | 13° C. |
| Boiling Point Range Distribution (D2887) | |
| 1% off | 168° C. |
| 5% off | 225° C. |
| 10% off | 252° C. |
| 20% off | 286° C. |
| 30% off | 314° C. |
| 40% off | 338° C. |
| 50% off | 357° C. |
| 60% off | 370° C. |

TABLE 5-continued

Properties of Distillate Feedstock

| | |
|---|---|
| 70% off | 381° C. |
| 80% off | 394° C. |
| 90% off | 412° C. |
| 95% off | 426° C. |
| 99% off | 449° C. |

The performance of the catalysts in Table 4 was evaluated based on activity for sulfur removal (hydrodesulfurization (HDS)), nitrogen removal (hydrodenitrogenation (HDN)), and cloud point reduction (dewaxing).

HDS and HDN activities of the four catalyst loadings shown in Table 4 were compared based on a direct basis and based on kinetic activity constants, which were normalized to the amount of molybdenum which was the metal responsible for the HDS activity. Normalizing the catalyst activity based on the molar amount of molybdenum provides a way to account for differences in catalyst density. For example, it is believed that citric acid was removed from the catalyst during activation. The following equations were used:

$$k_{HDS} = LHSV \times \left(1/\sqrt{S_{product}} - 1/\sqrt{S_{feed}}\right) \times C \quad \text{(1.5 order)}$$

$$k_{HDN} = LHSV \times \ln\left(\frac{N_{feed}}{N_{product}}\right) \quad \text{(1st order)}$$

The constant "C" was 100 and was further divided by the total moles of molybdenum present on the catalysts as determined by X-ray fluorescence.

Figure 5:
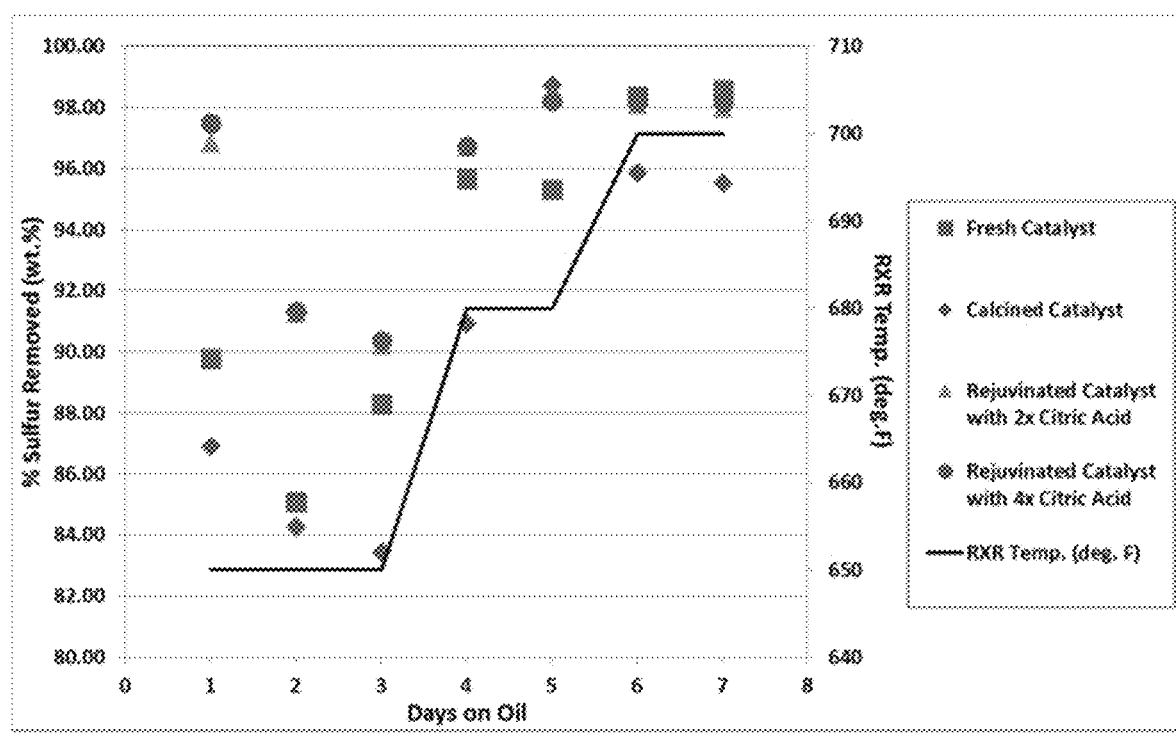
FIG. 5 shows results for sulfur removal during processing a distillate feed over various supported base metal dewaxing catalysts.
Figure 6:
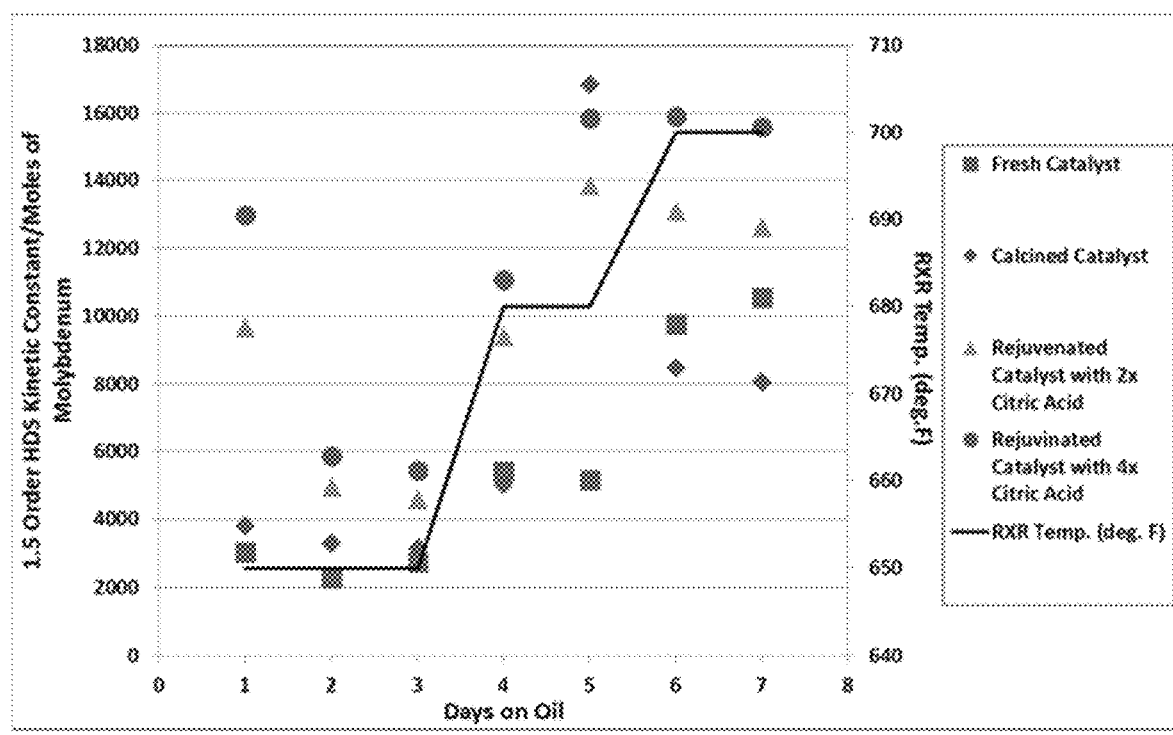
FIG. 6 shows normalized activity constants results from processing a distillate feed over the supported base metal dewaxing catalysts in FIG. 5.

With regard to sulfur removal, FIG. 5 shows sulfur removal results based on exposing the feed in Table 5 to the four catalyst loadings shown in Table 4 while FIG. 6 shows a comparison of the normalized hips constants. The HDS data in FIG. 6 was fit to a 1.5 order kinetic model, as would be expected by one of skill in the art for modeling of sulfur removal under hydroprocessing conditions. Both of these figures suggest that the rejuvenated catalyst (2× citric acid) and the rejuvenated catalyst (4× citric acid) had higher HDS activity recovery (nearly ~100%) than the calcined catalyst, which had lower HDS activity recovery compared to the fresh catalyst.

Figure 7:
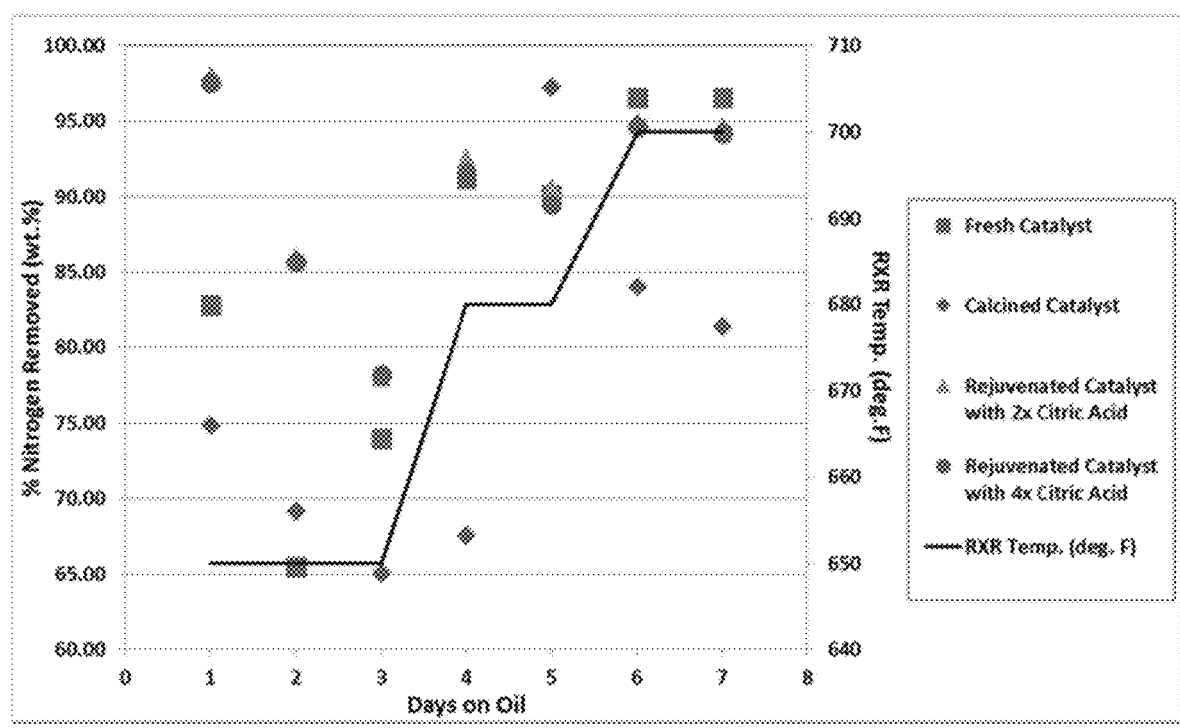
FIG. 7 shows results for nitrogen removal during processing a distillate feed over various supported base metal dewaxing catalysts.
Figure 8:
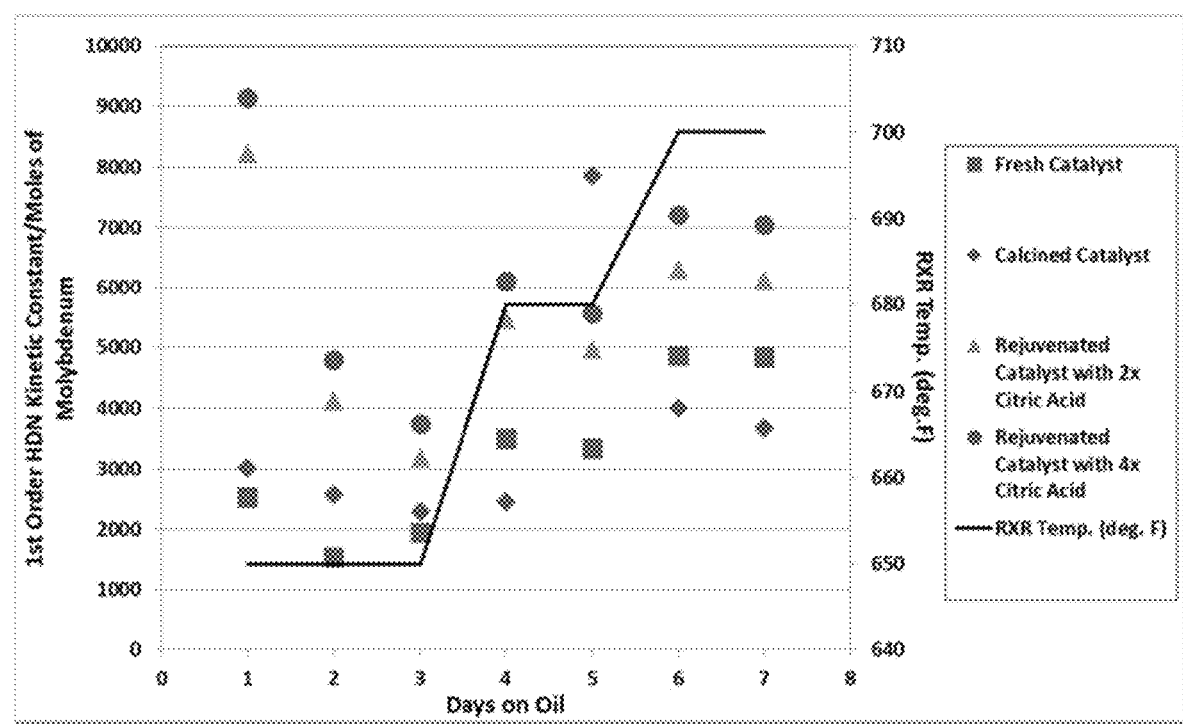
FIG. 8 shows normalized activity constants results from processing a distillate feed over the supported base metal dewaxing catalysts in FIG. 7.
Figure 9:
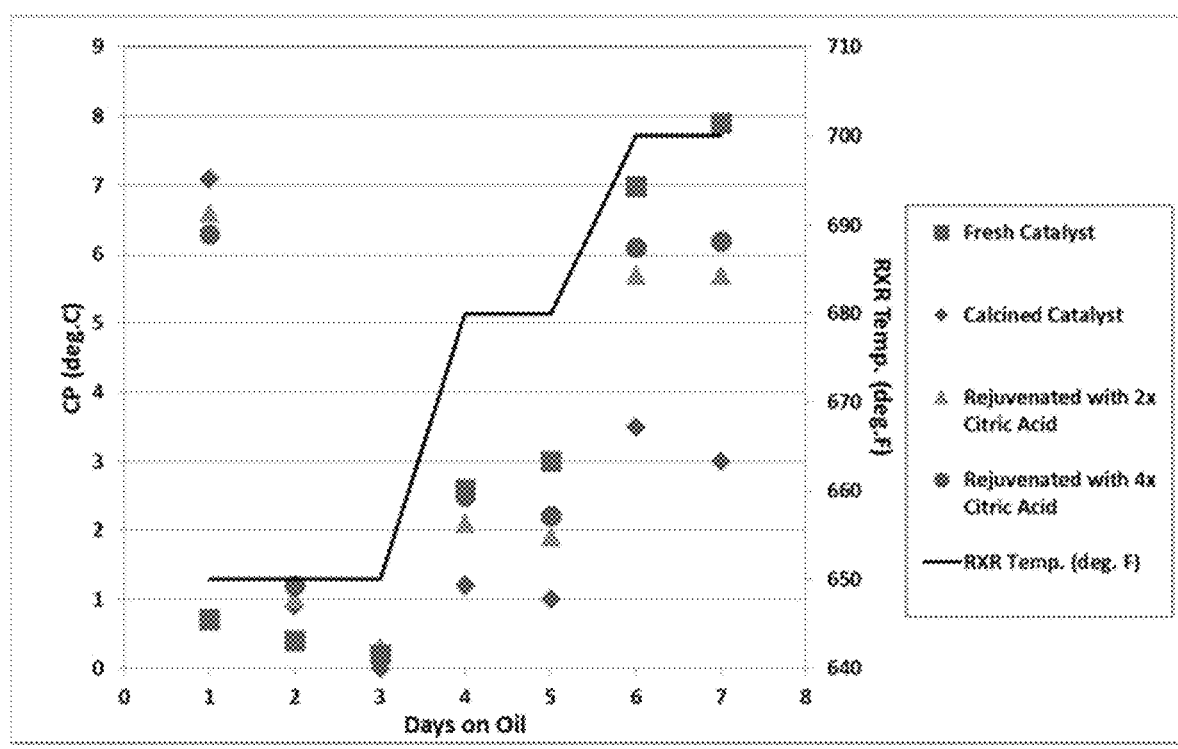
FIG. 9 shows results for cloud point reduction during processing a distillate feed over various supported base metal dewaxing catalysts.
Figure 10:
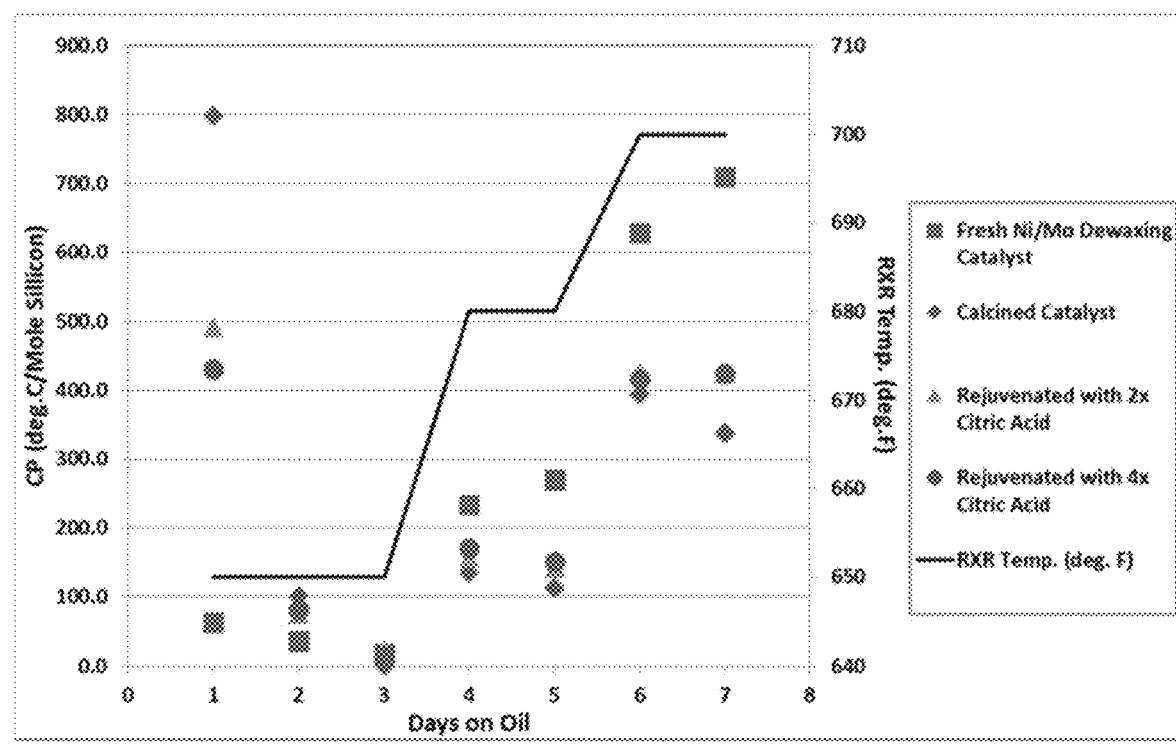
FIG. 10 shows results for cloud point reduction normalized based on the molar silicon content of the catalysts from processing a distillate feed over the supported base metal dewaxing catalysts in FIG. 9.

With regard to nitrogen removal, FIG. 7 shows nitrogen removal results based on exposing the feed in Table 5 to the four catalyst loadings shown in Table 4 while FIG. 8 shows a comparison of the normalized $k_{HDN}$ constants. The HDN data in FIG. 8 was fit to a first order kinetic model, as would be expected by one of skill in the art for modeling of nitrogen removal under hydroprocessing conditions. Both of these figures suggest that the rejuvenated catalyst (2× citric acid) and the rejuvenated catalyst (4× citric acid) had higher HDN activity recovery (nearly ~100%) than the calcined catalyst, which had lower HDN activity recovery compared to the fresh catalyst. Dewaxing activity was compared based on a measurement of cloud point difference between the feed and product. Feed and product cloud points were measured using ASTM method D7346. FIG. 9 shows the cloud point reduction for the four catalysts in Table 4 at the same reaction conditions as the data in FIGS. 5-8. FIG. 10 shows the cloud point data from FIG. 9 after being normalized based on the molar silicon content of the catalysts.

ADDITIONAL EMBODIMENTS

Embodiment 1

A method for regenerating and rejuvenating a spent catalyst, wherein the method comprises: a regeneration step comprising: calcining the spent catalyst in the presence of air at a temperature of about 370° C. to about 710° C., optionally for at least about 30 minutes, to remove at least a portion of coke present on the spent catalyst to form a calcined catalyst; and a rejuvenation step comprising: contacting a solution comprising a complexing agent with the calcined catalyst to form a modified catalyst, wherein a molar ratio of the complexing agent to a base metal present in the spent catalyst is at least about 1.25 (e.g., about 1.25 to about 10); and drying the modified catalyst to form a rejuvenated catalyst.

Embodiment 2

The method of Embodiment 1, wherein the regeneration step further comprises calcining the spent catalyst in the presence of an inert gas at a temperature of about 370° C. to about 710° C.

Embodiment 3

The method of Embodiment 1 or 2, wherein the regeneration step further comprises removing at least a portion of residual hydrocarbons on the spent catalyst by contacting the spent catalyst with air and/or nitrogen to dry the spent catalyst.

Embodiment 4

The method of any one of the previous Embodiments, wherein about 5.0 wt % to 95 wt % of the coke is removed from the spent catalyst during the regeneration step.

Embodiment 5

The method of any one of the previous Embodiments, wherein the complexing agent comprises an organic compound comprising 2-10 carbon atoms and a carbon atom to oxygen atom ratio of about 0.6 to about 2 and wherein the complexing agent optionally comprises a glycol, a carboxylic acid, or a combination thereof.

Embodiment 6

The method of any one of the previous Embodiments, wherein the solution comprising the complexing agent is contacted with the calcined catalyst at a temperature of about 15° C. to less than the boiling point of the solution and/or for about 30 minutes to about 120 minutes.

Embodiment 7

The method of any one of the previous Embodiments, wherein the modified catalyst is dried at a temperature of about 50° C. to about 250° C.

Embodiment 8

The method of any one of the previous Embodiments, wherein the rejuvenated catalyst has at least about 90% hydrodesulfurization (HDS) activity recovered and/or at least about 90% hydrodenitrogenation (HDN) activity recovered.

Embodiment 9

The method of any one of the previous Embodiments, wherein the spent catalyst comprises at least one Group 8-10 base metal and at least one Group 6 metal on a support comprising a zeolite framework structure

Embodiment 10

A method for removing coke from a spent catalyst, wherein the method comprises: calcining the spent catalyst comprising at least one Group 8-10 base metal and at least one Group 6 metal on a support comprising a zeolite framework structure: (i) in the presence of an inert gas at a temperature of about 370° C. to about 710° C. to remove at least a portion of coke present on the spent catalyst; and (ii) in the presence of air at a temperature of about 370° C. to about 710° C. to remove at least a further portion of coke present on the spent catalyst to form a calcined catalyst.

Embodiment 11

The method of Embodiment 10 further comprising removing at least a portion of residual hydrocarbons on the spent catalyst by contacting the spent catalyst with air and/or nitrogen to dry the spent catalyst.

Embodiment 12

The method of Embodiment 10 or 11, wherein at about 5.0 wt % to 95 wt % of the coke is removed from the spent catalyst.

Embodiment 13

A method for rejuvenating a spent catalyst, wherein the method comprises: contacting a solution comprising a complexing agent with a spent catalyst to form a modified catalyst, wherein the spent catalyst comprises at least one Group 8-10 base metal and at least one Group 6 metal on a support comprising a zeolite framework structure; and wherein a molar ratio of the complexing agent to the at least one Group 8-10 base metal present in the spent catalyst is at least about 1.25 (e.g., about 1.25 to about 10); and drying the modified catalyst to form a rejuvenated catalyst.

Embodiment 14

The method of Embodiment 13, wherein the solution is contacted with the spent catalyst at a temperature of from about 15° C. to less than the boiling point of the solution and/or for about 30 minutes to about 120 minutes and the modified catalyst is dried at a temperature of about 50° C. to less than 250° C.

Embodiment 15

The method of Embodiment 13 or 14, wherein the complexing agent comprises an organic compound comprising 2-10 carbon atoms and a carbon atom to oxygen atom ratio of about 0.6 to about 2 and wherein the complexing agent optionally comprises a glycol, a carboxylic acid, or a combination thereof.

Embodiment 16

The method of any one of Embodiments 9 to 15, wherein the at least one Group 8-10 base metal optionally comprises Ni, Co, or a combination thereof and the at least one Group 6 metal optionally comprises W, Mo or a combination thereof.

Embodiment 17

The method of any one of Embodiments 9 to 16, wherein the zeolite framework structure is selected from the group consisting of EUO, FAU, FER, MEL, MFI, MRE, MTT, USY, and a combination thereof.

Embodiment 18

The method of any one of Embodiments 9 to 17, wherein the zeolite framework structure comprises ZSM-5, ZSM-11, ZSM-23 ZSM-48, a zeolitic framework structure having a 10-member ring as a largest pore channel, or a combination thereof.

Embodiment 19

A regenerated and/or rejuvenated catalyst produced by the method of any one of the previous embodiments.

Additional Embodiment A

A method for treating a distillate boiling range feed, comprising: exposing a distillate boiling range feed to a dewaxing catalyst formed according to any one of Embodiments 1 to 18 under effective hydroprocessing conditions, wherein the dewaxing catalyst is optionally sulfide prior to exposure to the distillate boiling rage feed.

Additional Embodiment B

A method for treating a distillate boiling range feed, comprising: exposing a distillate boiling range feed to a hydrotreating catalyst under effective hydroprocessing conditions to form a hydrotreated effluent; and exposing at least a portion of the hydrotreated effluent to a dewaxing catalyst formed according to any one of Embodiments 1 to 18 under effective hydroprocessing conditions, wherein the dewaxing catalyst is optionally sulfide prior to exposure to the distillate boiling rage feed.

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

The invention claimed is:
1. A method for regenerating and rejuvenating a spent catalyst, wherein the method comprises:
a regeneration step comprising:
calcining the spent catalyst in the presence of air at a temperature of about 370° C. to about 710° C. to remove at least a portion of coke present on the spent catalyst to form a calcined catalyst, wherein the spent catalyst comprises at least one Group 8-10 base metal and at least one Group 6 metal on a support comprising a zeolite framework structure, wherein the at least one Group 8-10 base metal comprises Ni,

Co, or a combination thereof and the at least one Group 6 metal comprises W, Mo, or a combination thereof; and a rejuvenation step comprising:
contacting a solution comprising a complexing agent with the calcined catalyst to form a modified catalyst, wherein the complexing agent comprises an organic compound comprising 2-10 carbon atoms and a carbon atom to oxygen atom ratio of about 0.6 to about 2, wherein a molar ratio of the complexing agent to the base metal present in the spent catalyst is at least about 1.25; and drying the modified catalyst to form a rejuvenated catalyst.

2. The method of claim 1, wherein the regeneration step further comprises calcining the spent catalyst in the presence of an inert gas at a temperature of about 370° C. to about 710° C.

3. The method of claim 1, wherein the regeneration step further comprises removing at least a portion of residual hydrocarbons on the spent catalyst by contacting the spent catalyst with air and/or nitrogen to dry the spent catalyst.

4. The method of claim 1, wherein about 5.0 wt % to 95 wt % of the coke is removed from the spent catalyst during the regeneration step.

5. The method of claim 1, wherein the spent catalyst is calcined in air for at least about 30 minutes.

6. The method of claim 1, wherein the molar ratio of the complexing agent to the base metal present in the spent catalyst is at least about 1.25 to about 10.

7. The method of claim 1, wherein the complexing agent comprises a glycol, a carboxylic acid, or a combination thereof.

8. The method of claim 1, wherein the solution comprising the complexing agent is contacted with the calcined catalyst at a temperature of about 15° C. to less than the boiling point of the solution and/or for about 30 minutes to about 120 minutes.

9. The method of claim 1, wherein the modified catalyst is dried at a temperature of about 50° C. to about 250° C.

10. The method of the claim 1, wherein the rejuvenated catalyst has at least about 90% hydrodesulfurization (HDS) activity recovered and/or at least about 90% hydrodenitrogenation (HDN) activity recovered.

11. The method of claim 1, wherein the zeolite framework structure is selected from the group consisting of EUO, FAU, FER, MEL, MFI, MRE, MTT, USY, and a combination thereof.

12. The method of claim 1, wherein the zeolite framework structure comprises ZSM-5, ZSM-11, ZSM-23 ZSM-48, a zeolitic framework structure having a 10-member ring as a largest pore channel, or a combination thereof.

13. A method for removing coke from and rejuvenating a spent catalyst, wherein the method comprises:
calcining the spent catalyst comprising at least one Group 8-10 base metal and at least one Group 6 metal on a support comprising a zeolite framework structure:
(i) in the presence of an inert gas at a temperature of about 370° C. to about 710° C. to remove at least a portion of coke present on the spent catalyst; and
(ii) in the presence of air at a temperature of about 370° C. to about 710° C. to remove at least a further portion of coke present on the spent catalyst to form a calcined catalyst;

contacting a solution comprising a complexing agent with the spent catalyst to form a modified catalyst, wherein the complexing agent comprises an organic compound comprising 2-10 carbon atoms and a carbon atom to oxygen atom ratio of about 0.6 to about 2; and wherein a molar ratio of the complexing agent to the at least one Group 8-10 base metal present in the spent catalyst is at least about 1.25; and drying the modified catalyst to form a rejuvenated catalyst.

14. The method of claim 13 further comprising removing at least a portion of residual hydrocarbons on the spent catalyst by contacting the spent catalyst with air and/or nitrogen to dry the spent catalyst.

15. The method of claim 13, wherein at about 5.0 wt % to 95 wt % of the coke is removed from the spent catalyst.

16. The method of claim 13, wherein the solution is contacted with the spent catalyst at a temperature of from about 15° C. to less than the boiling point of the solution and/or for about 30 minutes to about 120 minutes; and the modified catalyst is dried at a temperature of about 50° C. to less than 250° C.

17. The method of claim 13, wherein the complexing agent comprises a glycol, a carboxylic acid, or a combination thereof.

* * * * *